(12) United States Patent
Sosso et al.

(10) Patent No.: US 12,394,332 B2
(45) Date of Patent: Aug. 19, 2025

(54) COMPUTER-AUTOMATED SYSTEMS AND METHODS FOR USING LANGUAGE MODELS TO GENERATE TEXT BASED ON READING ERRORS

(71) Applicant: SkyHigh Ventures, LLC, Gibsonia, PA (US)

(72) Inventors: Scott Sosso, Gibsonia, PA (US); Siyu Chen, Pittsburgh, PA (US); Ciara Figliuolo, Williamsburg, PA (US); Jack Mostow, Glennview, IL (US); Marlies Goes, Pittsburgh, PA (US)

(73) Assignees: SkyHigh Ventures, LLC, Gibsonia, PA (US); Government of the United States, as Represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/659,230

(22) Filed: May 9, 2024

(65) Prior Publication Data
US 2024/0379022 A1    Nov. 14, 2024

Related U.S. Application Data

(60) Provisional application No. 63/465,842, filed on May 11, 2023.

(51) Int. Cl.
  G09B 17/00    (2006.01)
  G10L 13/08    (2013.01)
(52) U.S. Cl.
  CPC ............ G09B 17/003 (2013.01); G10L 13/08 (2013.01)
(58) Field of Classification Search
  CPC ........ G09B 17/003; G09B 17/00; G10L 13/08
  (Continued)

(56) References Cited

U.S. PATENT DOCUMENTS 5,920,838 A * 7/1999 Mostow ................. G09B 5/065
                                                   704/266
10,424,217 B1   9/2019 Sheehan
(Continued)

FOREIGN PATENT DOCUMENTS

CN     115295020 A    11/2022
KR   20120111855 A    10/2012

OTHER PUBLICATIONS

"A Machine Learning Approach to Reading Level Assessment," Petersen et al., University of Washington CSE Technical Report, Jun. 15, 2006, pp. 1-20 (Year: 2006).*
(Continued)

*Primary Examiner* — Kurt Fernstrom
(74) *Attorney, Agent, or Firm* — Blueshift IP; Robert Plotkin

(57) ABSTRACT

A computer-implemented system and method generate personalized text based on statistics derived from input received from a user representing the user's attempts to decode graphemes into phonemes. Such statistics may be measured and recorded at the grapheme-phoneme level, and may include substitutions, insertions, deletions, and correct utterances of phonemes by the user when reading text. A language model may be trained based on characteristics of the user, such as the user's age and/or reading grade level, and the personalized text may be generated after such training of the language model. Generating the personalized text may include generating a text creation prompt based on the statistics. The resulting text creation prompt may include a set of target words. The text creation prompt may be provided to the language model, which may generate the personalized text in response. The personalized text may include some or all of the target words.

16 Claims, 14 Drawing Sheets

(58) Field of Classification Search
USPC .......................................................... 434/178
See application file for complete search history.

(56) References Cited

U.S. PATENT DOCUMENTS

| | | | |
|---|---|---|---|
| 10,699,592 B2 | 6/2020 | Kochura | |
| 2008/0070205 A1 | 3/2008 | Amick | |
| 2022/0293007 A1* | 9/2022 | Haruta | G09B 19/04 |
| 2023/0027035 A1* | 1/2023 | Gagliano | G06F 40/56 |
| 2023/0137209 A1* | 5/2023 | Nangi | G06F 40/216 |
| | | | 704/9 |

OTHER PUBLICATIONS

"Dall-E 2," golden.com, https://web.archive.org/web/20230321203048/https://golden.com/wiki/Dall-E_2-EKMN8GY, Mar. 21, 2023 (Year: 2023).*

Valentini, Maria, et al. "On the Automatic Generation and Simplification of Children's Stories." arXiv preprint arXiv:2310.18502 (2023) 11 pages.

International Search Report and Written Opinion issued in App. No. PCT/US2024/028696, dated Aug. 27, 2024, 9 pages.

* cited by examiner

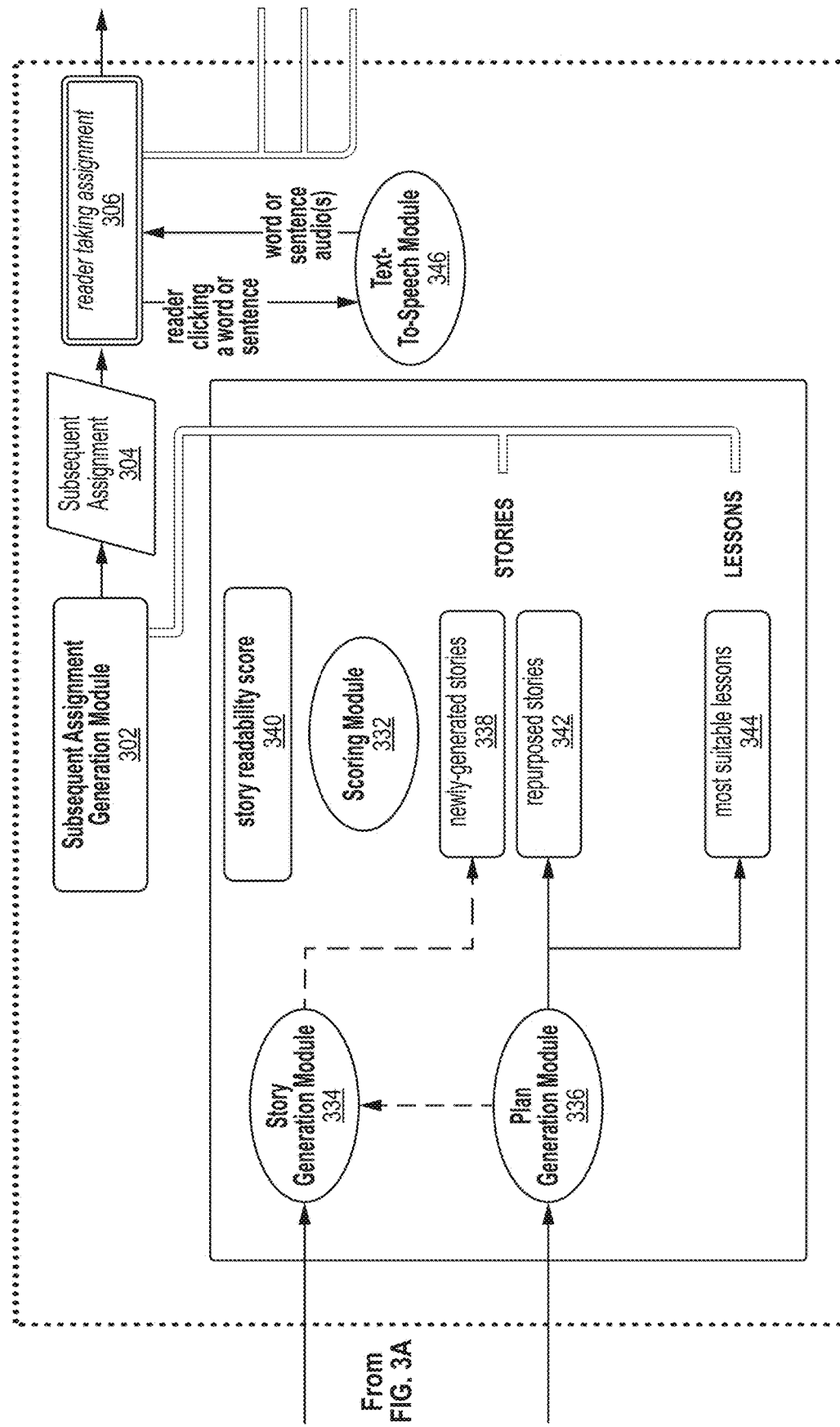

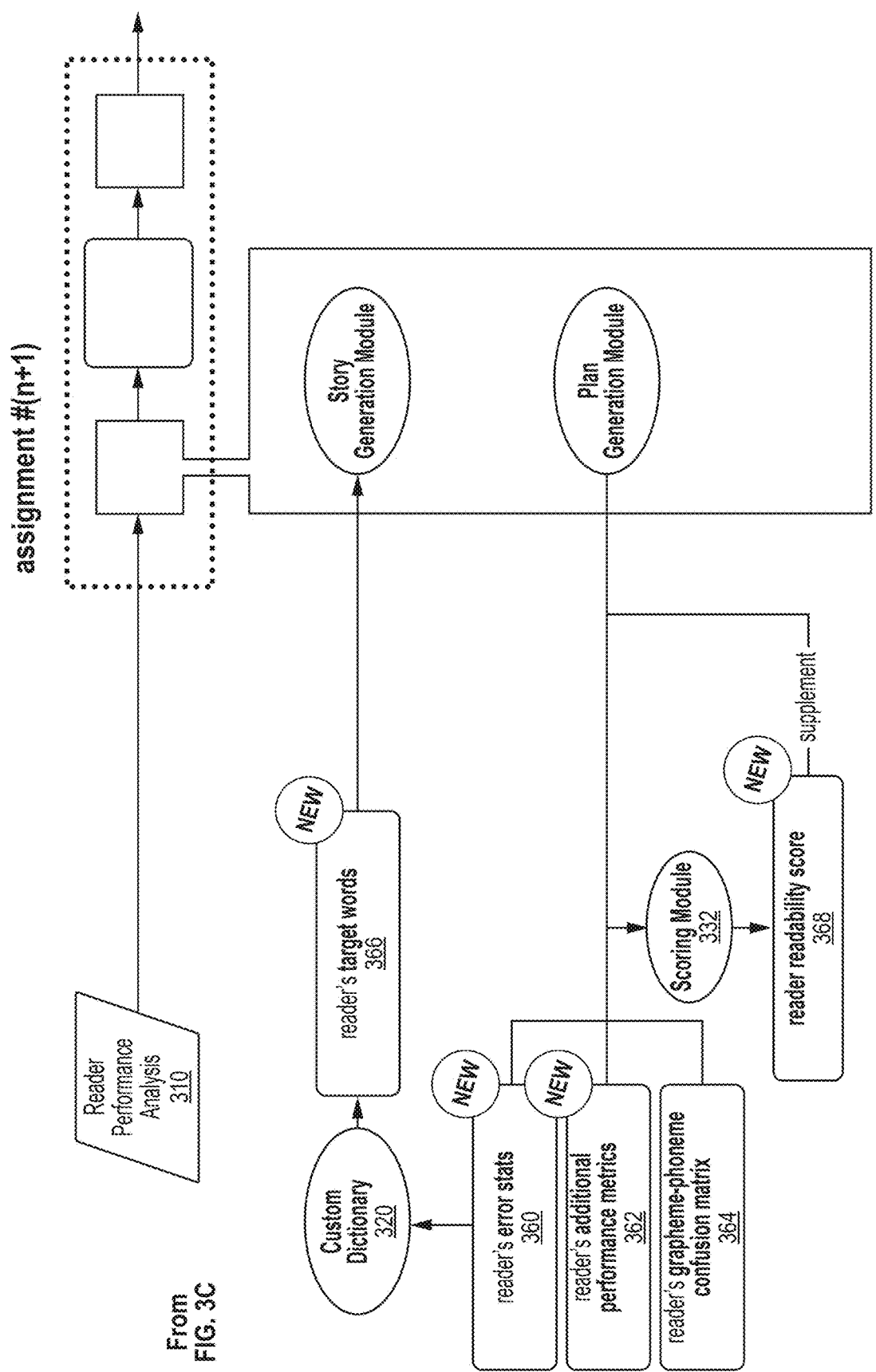

COMPUTER-AUTOMATED SYSTEMS AND METHODS FOR USING LANGUAGE MODELS TO GENERATE TEXT BASED ON READING ERRORS

CROSS-REFERENCE TO RELATED APPLICATIONS

This application claims priority to U.S. Prov. Pat. App. No. 63/465,842, filed on May 11, 2023, entitled, "The AI Tutor for Dyslexic Readers-Personalized Learning through Innovative Methods," which is hereby incorporated by reference herein.

BACKGROUND

Reading is a fundamental skill that is critical for educational development, personal growth, and active participation in society. However, many individuals, particularly children, face challenges in acquiring and improving their reading skills. These challenges can be due to a variety of factors, including learning disabilities such as dyslexia, which can affect a person's ability to decode the text they see before properly understanding what it means and how to read it, which is referred to as decoding graphemes into phonemes.

Traditional methods for improving reading skills often involve repetitive reading exercises in the presence of educational or pathological experts for timely instruction and in-depth understanding of decoding problems. These methods can be time-consuming, expensive, and may not dynamically adapt to an individual reader's specific needs to improve at the decoding of certain letter-sound pairs. Moreover, conventional reading materials may not engage the reader's interest or may use words which are beyond the reader's current reading age, which can lead to a lack of motivation and engagement in the reading process.

Prior art in the field of educational technology has attempted to address some of these challenges by providing digital reading platforms and adaptive learning systems. These systems often include features such as word games, reading comprehension exercises, and progress tracking. However, they may not provide a sufficiently personalized experience that adapts to the unique learning pace and interests of each reader. Additionally, many existing systems do not adequately focus on the individual phonetic errors a reader makes, nor do they offer a method for systematically identifying and addressing these errors through personalized content.

In light of the foregoing, there is a need for an improved method for generating reading materials that can provide a personalized and engaging reading experience. Such a method would ideally identify and target the reader's specific difficulties, adapt to their reading level and interests, and facilitate the improvement of reading skills in an efficient and effective manner. The limitations of the prior art underscore the necessity for an innovative approach to personalized reading material generation that can overcome the aforementioned challenges.

SUMMARY

A computer-implemented system and method generate personalized text based on statistics derived from input received from a user representing the user's attempts to decode graphemes into phonemes. Such statistics may be measured and recorded at the grapheme-phoneme level, and may include substitutions, insertions, deletions, and correct utterances of phonemes by the user when reading text. A language model may be trained based on characteristics of the user, such as the user's age and/or reading grade level, and the personalized text may be generated after such training of the language model. Generating the personalized text may include generating a text creation prompt based on the statistics. The resulting text creation prompt may include a set of target words. The text creation prompt may be provided to the language model, which may generate the personalized text in response. The personalized text may include some or all of the target words. The personalized text may be annotated with corresponding grapheme-phoneme pairs and stored for future use.

Other features and advantages of various aspects and embodiments of the present invention will become apparent from the following description and from the claims.

BRIEF DESCRIPTION OF THE DRAWINGS

FIGS. 3A-3D are diagrams of a system for generating a subsequent assignment for the specific reader according to one embodiment of the present invention.

DETAILED DESCRIPTION

Figure 1A:
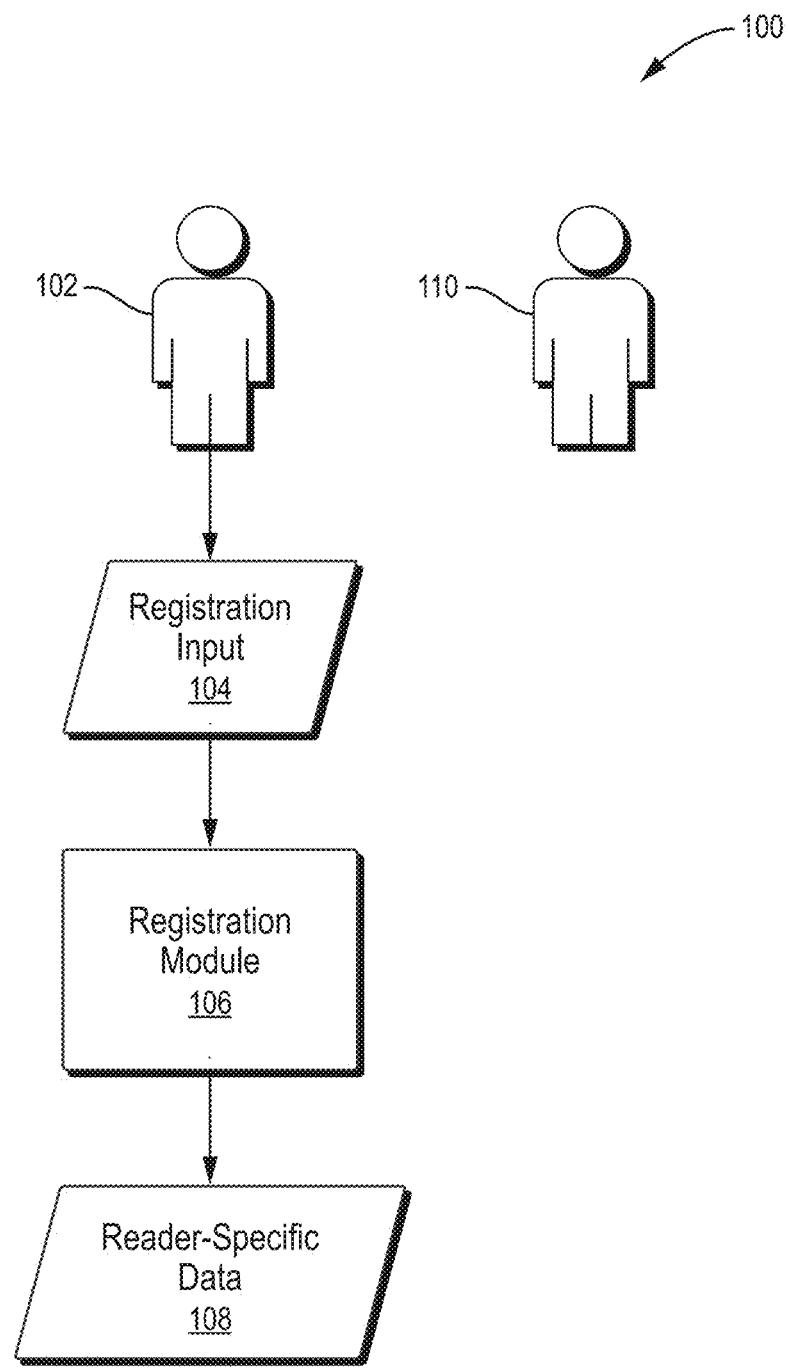
FIG. 1A is a diagram of a system for obtaining reader-specific information according to one embodiment of the present invention.

Embodiments of the present invention are directed to computer-implemented methods and systems for assisting readers, especially children with dyslexia, in improving their reading skills. Referring to FIG. 1A, a diagram is shown of a system 120 for obtaining reader-specific data 108 according to one embodiment of the present invention. The process performed by the system 100 of FIG. 1A is referred to herein as a registration process. In general, the system 100 performs the registration process to collect and generate reader-specific data 108 corresponding to a specific reader 110 (e.g., a child). Although the system 100 is only shown in connection with the specific reader 110, the system 100 may perform the registration process in connection with any number of readers to generate corresponding reader-specific data for each such reader, where the reader-specific data for different readers may be the same as or differ from each other in any of a variety of ways. Furthermore, although the term "reader" is used as a label for the specific reader 110, it should be understood that in some embodiments, the element 110 may be any user(s), whether or not such user(s) is/are reading any content or has previously read any content.

The system 100 is accessible to a user 102, who may be the specific reader 110 himself/herself, or another individual acting on behalf of the specific reader 110, such as a parent, guardian, or educator of the specific reader 110. As this implies, although the user 102 and the specific reader 110 are shown as separate people in FIG. 1A, this is not required. The user 102 may interact with the system 100 through a user interface that is designed to be intuitive and user-friendly, ensuring that the registration process is straightforward and accessible to users of varying technical proficiency.

The system 100 includes a registration module 106, which is responsible for guiding the user 102 through the registration process. The user 102 provides registration input 104, which may include any of a variety of information that is received and used by the registration module 106 to create a profile of the specific reader 110, within the reader-specific data 108.

The registration input 104 received by the registration module 106 may encompass any of a variety of data about the specific reader 110. This information may include, but is not limited to, any one or more of the following, in any combination: the specific reader 110's name, chronological age, reading grade level, language proficiency, known current reading challenges (e.g., dyslexia), interests, and outcomes of previous reading assessments or evaluations. The registration module 106 may also receive, within the registration input 104, additional data, such as the specific reader 110's interests and/or preferred writing styles.

Based on the registration input 104 provided by the user 102, the registration module 106 processes and compiles this information to create the reader-specific data 108. This data serves as a foundational profile that embodiments of the present invention use in subsequent processes to tailor reading experiences to the individual needs and preferences of the specific reader 110. The registration module 106 may generate the reader-specific data 108 in any of a variety of ways based on the registration input 104. For example, the registration module 106 may store one or more values from the registration input 104 (e.g., the specific reader 110's chronological age) into the reader-specific data 108. The registration module 106 may derive data from the registration input 104 and store such derived data in the reader-specific data 108. The registration module 106 may obtain data from one or more data sources other than the user 102 and the specific reader 110 (e.g., one or more schools at which the specific reader 110 is or was a student), including human and non-human data sources (e.g., databases and/or software applications) and use such data to generate the reader-specific data 108, such as by storing such data (or data derived therefrom) into the reader-specific data 108.

The registration module 106 may also enable the user 102 to input and assign login credentials (e.g., a username and password) to the account associated with the reader-specific data 108. The system 100 may require such credentials to be provided in order to gain access to the account. The system 100 may perform all steps necessary to ensure that the registration process complies with all applicable privacy laws and regulations, such as the Children's Online Privacy Protection Act (COPPA).

The reader-specific data 108 may evolve over time in any of a variety of ways. For example, as the specific reader 110's chronological age changes, such changes may be reflected in updates to the reader-specific data 108. Similarly, if the specific reader 110's reading grade level changes, the specific reader 110's new reading grade level may be stored in the specific reader 110's reader-specific data 108. Furthermore, what is shown and described herein as the reader-specific data 108 may be divided into any number of separate data, or combined, in whole or in part, with any other data disclosed herein. Furthermore, some or all of the reader-specific data 108 may be obtained and/or updated in any manner from any source(s), not only using the specific processes disclosed herein.

Figure 1B:
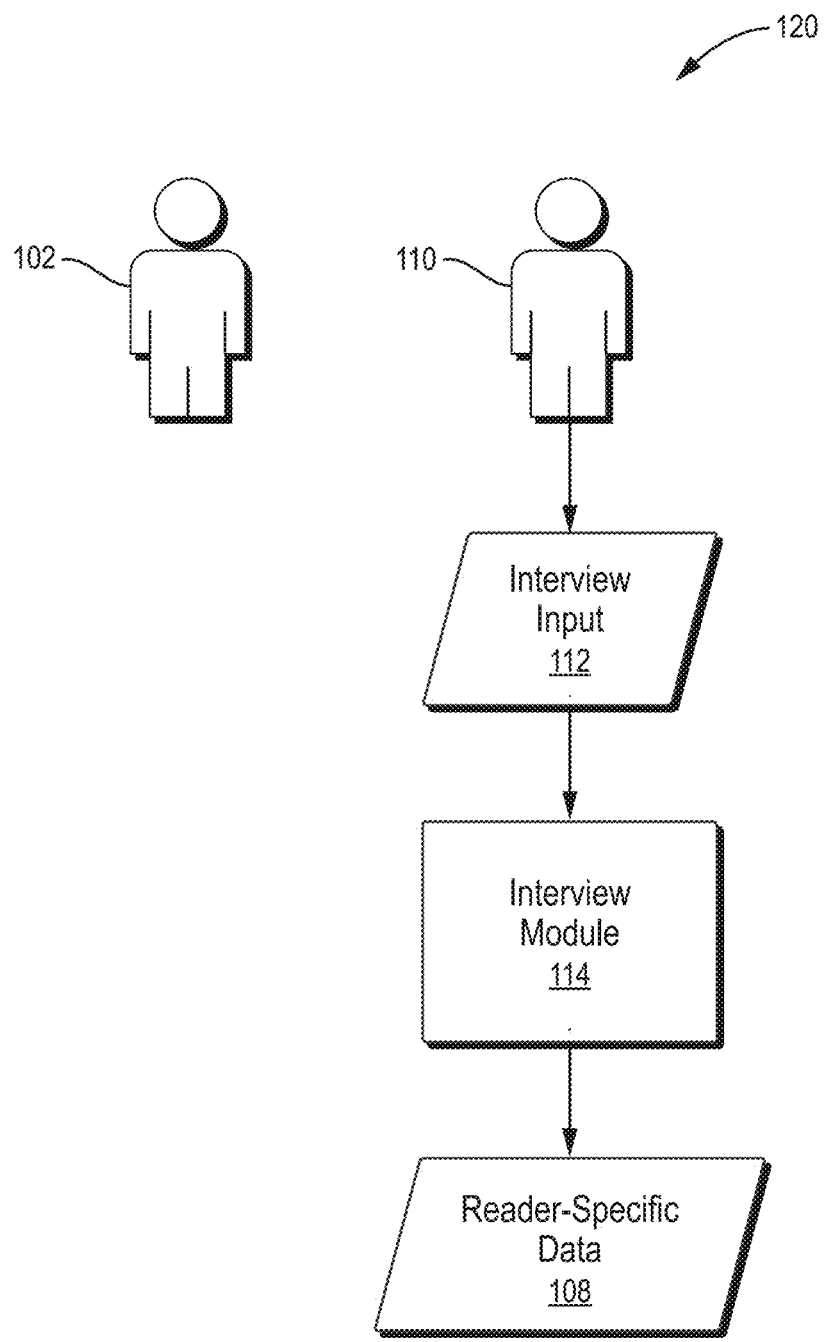
FIG. 1B is a diagram of a system for obtaining additional information about the specific reader as part of an initial interview process according to one embodiment of the present invention.

Referring to FIG. 1B, a diagram is shown of a system 120 for obtaining additional information about the specific reader 110 as part of an initial interview process. For example, the first time the specific reader 110 logs into their account, the system 120 may perform the initial interview process with the specific reader 110. (The same is applicable to any specific reader, not only the specific reader 110 shown in FIG. 1B.) Although FIG. 1B shows such additional information as being obtained from the specific reader 110 (e.g., child), in practice such information may be obtained from the user 102, the specific reader 110, any other source (human or machine), or any combination thereof. Furthermore, the registration process of FIG. 1A and the initial interview process of FIG. 1B may be combined or further subdivided in any way. Furthermore, although it may be helpful to perform the registration process of FIG. 1A and the initial interview process 110 of FIG. 1B as initial processes, before performing other processes disclosed herein, the registration process and the initial interview process may be repeated, in whole or in part, at any time and any number of times as may be helpful to update the reader-specific data 108 over time.

The system 120 includes an interview module 114, which is responsible for guiding the specific reader 110 through the initial interview process. The specific reader 110 provides interview input 112, which may include any of a variety of information that is received and used by the interview module 114 to update the reader-specific data 108.

When performing the initial interview process, the interview module 114 may present questions to the specific reader 110 in any of a variety of formats, such as text on the screen or spoken audio, to accommodate different learning preferences and abilities. The specific reader 110 may provide the interview input 112 via any of a variety of input modalities, such as typing, selecting from multiple-choice answers via a graphical user interface (GUI), or speaking. The interview module 114 may audibly confirm the specific reader 110's input by speaking that input aloud, such as by using a text-to-speech (TTS) module or playing stored audio, such as audio that was previously generated by a TTS module and then stored.

The questions provided by the interview module 114 may include any of a variety of questions, such as what are referred to herein as "interest questions," which are specifically designed to learn about the specific reader 110's personal interests. Such questions may be age-specific, with different sets of interest questions being tailored for each age group and presented in a particular order.

The questions provided by the interview module 114 may solicit the specific reader 110's preferred writing style(s), examples of which are science fact, science fiction, fairy tale, adventure, or fantasy. The questions provided by the interview module 114 may include questions which solicit the specific reader 110's preferred image style(s).

Based on the interview input 112 provided by the user 102, the interview module 114 processes and compiles this information to update the reader-specific data 108 based on the interview input 112. The interview module 114 may update the reader-specific data 108 in any of a variety of ways based on the interview input 112. For example, the interview module 114 may store one or more values from the interview input 112 (e.g., the specific reader 110's preferred writing style) into the reader-specific data 108. The interview module 114 may derive data from the interview input 112 and store such derived data in the reader-specific data 108. The interview module 114 may obtain data from one or more data sources other than the user 102 and the specific reader 110 (e.g., one or more schools at which the specific reader 110 is or was a student), and use such data to update the reader-specific data 108, such as by storing such data (or data derived therefrom) into the reader-specific data 108.

As in the case of the reader-specific data 108 stored by the registration process of FIG. 1A, the reader-specific data 108 stored by the initial interview process of FIG. 1B may evolve over time in any of a variety of ways. For example, as the specific reader 110's interests change, such changes may be reflected in updates to the reader-specific data 108.

While the registration process shown in FIG. 1A and the initial interview process shown in FIG. 1B are examples of methods for obtaining and updating the reader-specific data 108, it is important to note that these processes are merely exemplary embodiments of how such data may be collected and refined. The invention is not limited to these specific methods, and various other approaches can be employed to gather and update the reader-specific data 108 in any suitable manner.

For example, embodiments of the invention may incorporate alternative or additional methods to capture and refine the reader-specific data 108. For instance, ongoing interaction with the systems 100 and 120 may continuously provide data points that refine the reader-specific data 108. This may include, for example, data derived from the specific reader 110's interaction with reading materials, responses to adaptive learning activities, or direct feedback mechanisms within the systems 100 and 120. Each interaction may serve as an opportunity to gather more precise information about the specific reader 110's preferences, abilities, and challenges.

Furthermore, embodiments of the present invention may integrate external data sources to enrich the reader-specific data 108. This may include, for example, educational records, standardized test scores, social media accounts of the specific reader 110 and/or other users, and/or third-party educational tools. Such data may include metadata, such as author, date (e.g., creation date or modification date), or a rating (e.g., like). By synthesizing data from multiple sources, embodiments of the present invention may create a more holistic and accurate profile of the specific reader 110, which in turn may enhance the personalization and effectiveness of the reading assistance provided.

Additionally, machine learning algorithms may be employed to analyze the reader-specific data 108 and to predict changes in the specific reader 110's needs or abilities. Embodiments of the present invention may automatically update the reader-specific data 108 based on such predictions. This dynamic updating process may ensure that the reader-specific data 108 remains relevant and accurately reflects the specific reader 110's current state, thereby allowing embodiments of the present invention to adapt to the specific reader 110's evolving needs in real-time.

Embodiments of the present invention may also provide mechanisms for manual updates to the reader-specific data 108. Users, such as parents, educators, or the specific reader 110 himself/herself, may input updates directly into the system to reflect changes such as advancements in reading level, shifts in interests, or updates in personal information. Such updates may be used to update the reader-specific data 108 accordingly. This feature ensures that the reader-specific data 108 may be adjusted to accommodate changes that are not automatically captured by the system.

Figure 2:
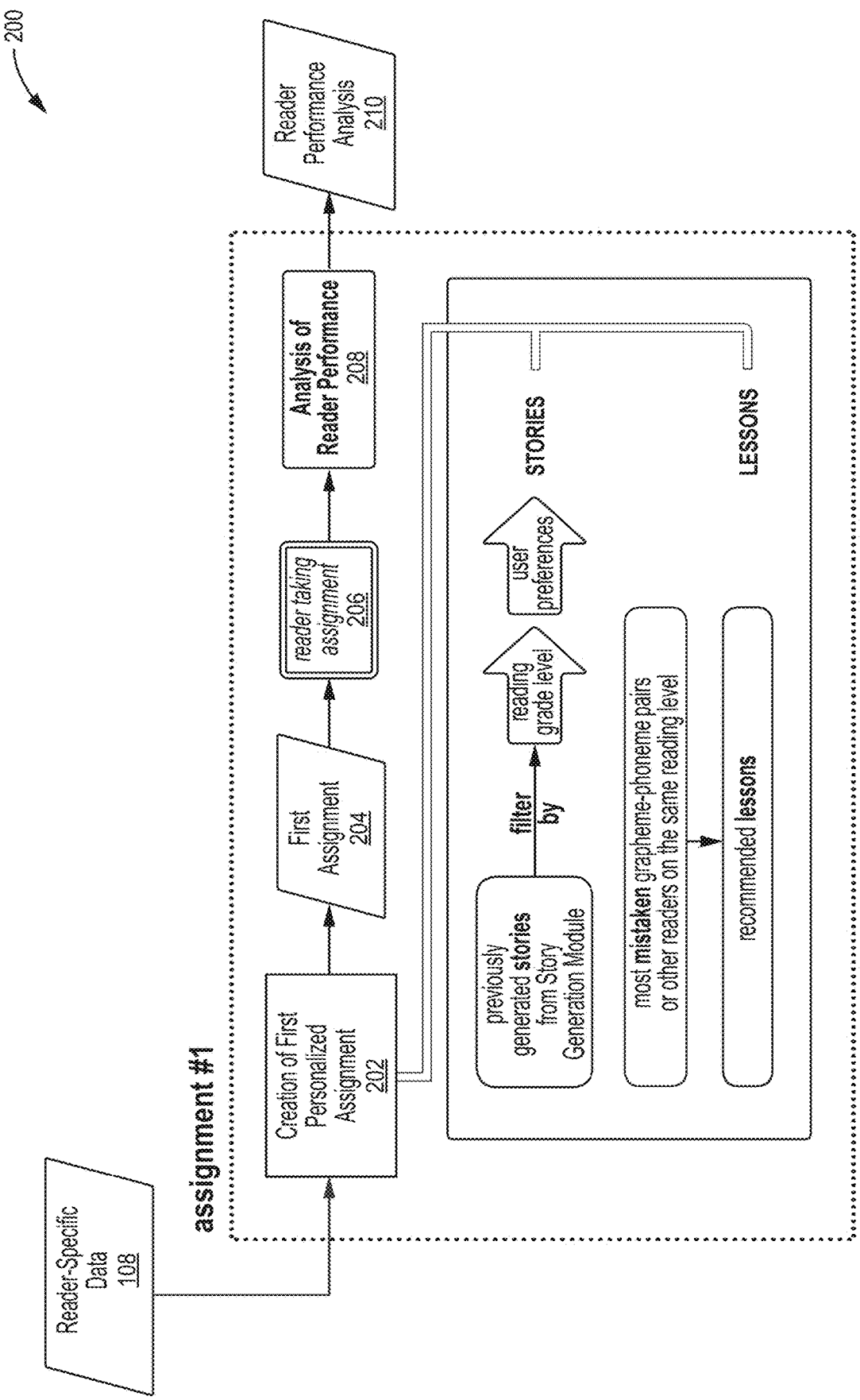
FIG. 2 is a diagram of a system for generating an initial assignment for the specific reader according to one embodiment of the present invention.

Referring to FIG. 2, a diagram is shown of a system 200 for generating an initial assignment 204 for the specific reader 110 according to one embodiment of the present invention. An "assignment," as that term is used herein, refers to data which may include one or more stories and/or one or more lessons. A story includes text, and may include additional content, such as any one or more of the following: audio, video, and one or more images. A lesson defines one or more tasks to be performed by a reader (e.g., the specific reader 110) to assist the reader in developing reading skills. Stories and lessons, including specific examples thereof, will be described in more detail below.

Embodiments of the present invention may use a different method to generate the initial assignment 204 (also referred to herein as the "first assignment") for the specific reader 110 than to generate subsequent assignments for the specific reader 110 because, at the time of generating the initial assignment 204, the system 200 may not have any data about the specific reader 110's performance in previous assignments. Although a particular method for generating the initial assignment 204 is shown in FIG. 2, this particular method is merely an example and does not constitute a limitation of the present invention. Furthermore, the method(s) used to generate subsequent assignments (i.e., assignment numbers 2, 3, and beyond) for the specific reader 110 may or may not be different from the method used to generate the initial assignment 204.

As shown in FIG. 2, the system 200 may include an initial assignment generation module 202, which may receive the specific reader 110's reader-specific data 108 and use the reader-specific data 108 to generate the specific reader 110's initial assignment 204.

One aspect of generating the initial assignment 204 is generating and/or selecting one or more stories for inclusion in the initial assignment 204, which is referred to herein generically as "identifying" one or more stories for ease of explanation. Generating a story may include generating the story in any of a variety of ways, such as by using any form(s) of generative artificial intelligence (AI), such as one or more language models (e.g., one or more large language models), in any of the ways disclosed herein. Although the description of certain examples herein refer to the use of generative AI, such as language models, to generate stories, embodiments of the invention may use any technique, in addition to or instead of generative AI, to generate stories. For example, any algorithm that does not use a language model or other form of generative AI may be used, in addition to or instead of generative AI, to generate any story or other data disclosed herein. Selecting a story may include selecting the story from a pre-stored set of stories. Any reference herein to "stories" included in the initial assignment 204 (or in any assignment) should be understood to refer to one or more stories.

The initial assignment generation module 202 may identify stories to include in the initial assignment 204 in any of a variety of ways. For example, the initial assignment generation module 202 may identify stories to include in the initial assignment 204 based on some or all of the data in the reader-specific data 108, such as any one or more of the following:

- The specific reader 110's interests and/or preferred writing style(s). Use of such preferences to identify the stories to include in the initial assignment 204 may help to make such stories engaging and relevant to the specific reader 110.
- The specific reader 110's reading grade level (also referred to using terms such as "reading age" and "reading level"). Use of the reading grade level to identify the stories to include in the initial assignment 204 may help to ensure that such stories are appropriate for the specific reader 110's reading ability. For example, previously-generated stories may be filtered by the specific reader 110's reading age so that only stories that are reading age-appropriate for the specific reader 110 are included in the initial assignment 204.

Another aspect of generating the initial assignment 204 is generating and/or selecting one or more lessons for inclusion in the initial assignment 204, which is referred to herein generically as "identifying" one or more lessons for ease of explanation. Selecting a lesson may include selecting the lesson from a pre-stored set of lessons. Any reference herein to "lessons" included in the initial assignment 204 (or in any assignment) should be understood to refer to one or more lessons.

The initial assignment generation module 202 may identify lessons to include in the initial assignment 204 in any of a variety of ways. For example, the initial assignment generation module 202 may identify lessons to include in the initial assignment 204 based on some or all of the data in the reader-specific data 108, such as the specific reader 110's reading age. The initial assignment generation module 202 may, for example, generate lessons in the initial assignment 204 by analyzing data from readers, other than the specific reader 110, whose reading grade level is the same as that of the specific reader 110. In particular, the initial assignment generation module 202 may identify the most-commonly mistaken grapheme-phoneme pairs among such readers, based on data obtained by embodiments of the present invention when observing the reading of such readers using the techniques disclosed elsewhere herein. The initial assignment generation module 202 may create one or more lessons in the specific reader 110's initial assignment 204 based on these identified error patterns, thereby ensuring that the lessons in the initial assignment 204 target areas that are appropriate for readers at that reading level. The initial assignment generation module 202 may use any metric of appropriateness to create lessons for the specific reader 110. For example, the initial assignment generation module 202 may create or select lessons that contain grapheme-phoneme pairs that have proven to be the most challenging for the specific reader 110 to decode, as evidenced by the specific reader 110's error statistics. As another example, the initial assignment generation module 202 may create or select lessons that contain grapheme-phoneme pairs that have proven to be the easiest (least mistaken) for the specific reader 110 to decode.

Once the initial assignment 204 has been generated, the system 200 may present the initial assignment 204 to the specific reader 110, including presenting the lessons and/or the stories within the initial assignment 204 to the specific reader 110. Such presentation may take any of a variety of forms, as described in more detail elsewhere herein. As will further be described below, the specific reader 110 may interact with the system 200 in any of a variety of ways in response to being presented with the lessons and stories within the initial assignment 204. The combination of all such presentation by the system 200 of the lessons and stories within the initial assignment 204 to the specific reader 110 and the specific reader 110's interactions with the system 200 is referred to herein as the specific reader 110 taking the initial assignment 206.

The system 200 also includes a reader performance analysis module 208, which analyzes the performance of the specific reader 110 when taking the initial assignment 206. The reader performance analysis module 208 may perform its functions while the specific reader 110 is taking the initial assignment, after the specific reader 110 has taken the initial assignment 206, or any combination thereof. As will be described in more detail below, analyses that may be performed by the reader performance analysis module 208 include, for example, analyzing any one or more of the following: the specific reader 110's reading fluency, accuracy, comprehension, prosody, and any phonetic errors made. The reader performance analysis module 208 may generate output, referred to herein as reader performance analysis 210, containing data representing the results of any analysis performed by the reader performance analysis module 208, such as values of the specific reader 110's reading fluency, accuracy, and types/frequency of phonetic errors made, and/or data derived from any of the foregoing.

The initial assignment generation process performed by the system 200 has a variety of advantages. For example, by aligning the initial assignment with the specific reader 110's interests, reading age, and reading level, the system 200 ensures that the specific reader 110 is more likely to be engaged and motivated to read. This engagement process also involves customizing the assignment to the specific reader 110's reading level, providing a suitable challenge without overwhelming them. This customization may resort to any of a variety of design choices to ensure that the initial assignment 204 is engaging, encouraging, and challenging to the specific reader 110 (e.g., by choosing lessons that contain the most mistaken grapheme-phoneme pairs by the specific reader 110, or by choosing lessons that most readers who are of the same chronological age or reading age as the specific reader 110 have little or no difficulty decoding). Such customization may build confidence, trigger motivation, develop targeted decoding skills, and address common areas of reading difficulty for the specific reader 110. The process may be data-driven, such as by using information from other readers at the same reading level to inform lesson generation. This ensures that the lessons are relevant and effective. Furthermore, by analyzing the specific reader 110's performance, the system 200 may provide valuable feedback on their progress and identify areas that may require further attention.

After the specific reader 110 completes (finishes taking) the initial assignment 204, embodiments of the present invention may use one or more different methods for generating subsequent assignments. The subsequent assignment generation process may be more dynamic and responsive than the initial assignment generation process because it may incorporate data generated and/or obtained from the specific reader 110's past interactions with embodiments of the present invention, such as from the specific reader 110's taking of one or more previous lessons.

Referring to FIGS. 3A-3D, diagram are shown of a system 300 for generating a subsequent assignment 304 for the specific reader 110 according to one embodiment of the present invention. If the initial assignment 204 generated by the system 200 of FIG. 2 is considered to be assignment #1, then the subsequent assignment 304 may be any assignment n, where n>1. In other words, the system 300 may be used to generate assignment numbers 2, 3, 4, and so on for the specific reader 110. For ease of illustration, the system 300 is divided among FIGS. 3A-3D. Therefore, any reference herein to the system 300 should be understood to refer to some or all of the system 300 as illustrated in some or all of FIGS. 3A-3D.

As shown in FIGS. 3A-3D, the system 300 may include a subsequent assignment generation module 302, which may receive as input: (1) the specific reader 110's reader-specific data 108; and (2) one or more reader performance analyses of the specific reader 110 generated based on the specific reader 110's taking of one or more previous assignments. For example, in the case of assignment #2, the subsequent assignment generation module 302 may receive the reader performance analysis 210 generated by the reader performance analysis module 208 from the specific reader 110's performance taking the initial assignment 206 (i.e., assignment #1). More generally, if the assignment generated by the subsequent assignment generation module 302 is assignment number n, then the subsequent assignment generation module 302 may receive one or more instances of the reader performance analysis 210 generated by the reader performance analysis module 208 based on the specific reader 110's performance taking any one or more assignments number n−1 or lower.

The subsequent assignment generation module 302 may use the reader-specific data 108 and the received reader performance analysis/analyses to generate a subsequent assignment 304 for the specific reader 110. Once the subsequent assignment 304 has been generated, the specific reader 110 takes the subsequent assignment 306, which may include the system 300 presenting the subsequent assignment 304 to the specific reader 110 in any of the ways disclosed herein. The system 300 also includes a reader performance analysis module 308, which analyzes the performance of the specific reader 110 when taking the subsequent assignment 304. The reader performance analysis module 308 may perform its functions while the specific reader 110 is taking the subsequent assignment 304, after the specific reader 110 has taken the subsequent assignment 304, or any combination thereof. The reader performance analysis module 308 may generate output, referred to herein as reader performance analysis 310, containing data representing the results of any analysis performed by the reader performance analysis module 308, such as values of the specific reader 110's reading fluency, accuracy, comprehension, and types/frequency of phonetic errors made. The system 300 may provide the reader performance analysis 310 output, and the reader performance analysis 310 may be received as an input to the next iteration of the system 300 when generating the next subsequent assignment.

As FIGS. 3A-3D and the above description makes clear, the process just described may be performed repeatedly to generate any number of subsequent assignments. For example, if the system 200 is applied to generate the initial assignment 204 (i.e., assignment #1), then the system 300 may initially be applied to generate a first instance of the subsequent assignment 304 (i.e., assignment #2). The system 300 may then be applied again to generate a second instance of the subsequent assignment 304 (assignment #3), and so on for any number of assignments. The reader performance analysis 310 that is output by each iteration of the system 300 may be received as an input to the next iteration of the 300.

Having described the operation of the system 300 at a high level, certain embodiments of the system 300 will now be described in more detail.

Figure 3A:
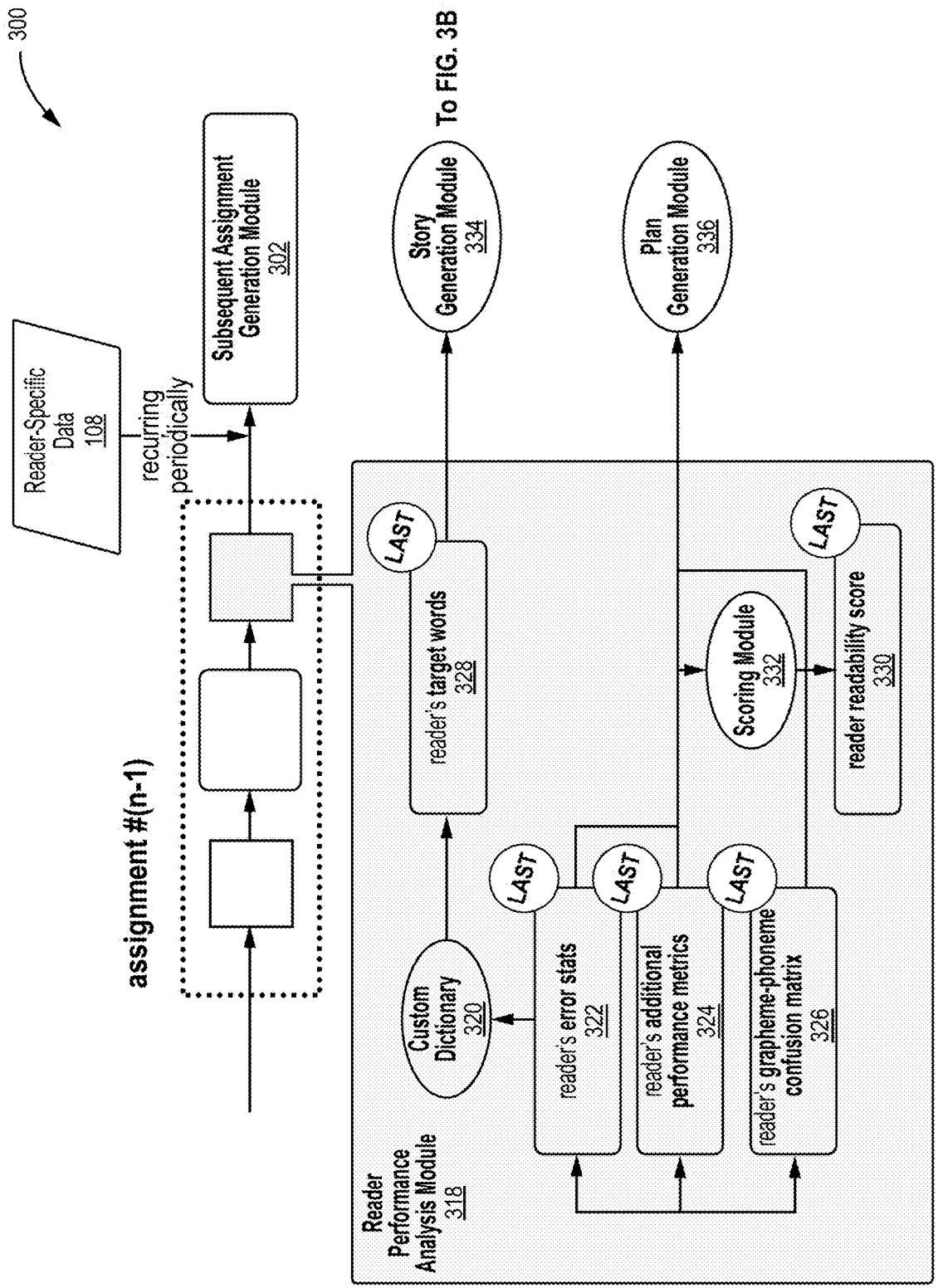
Figure 3C:
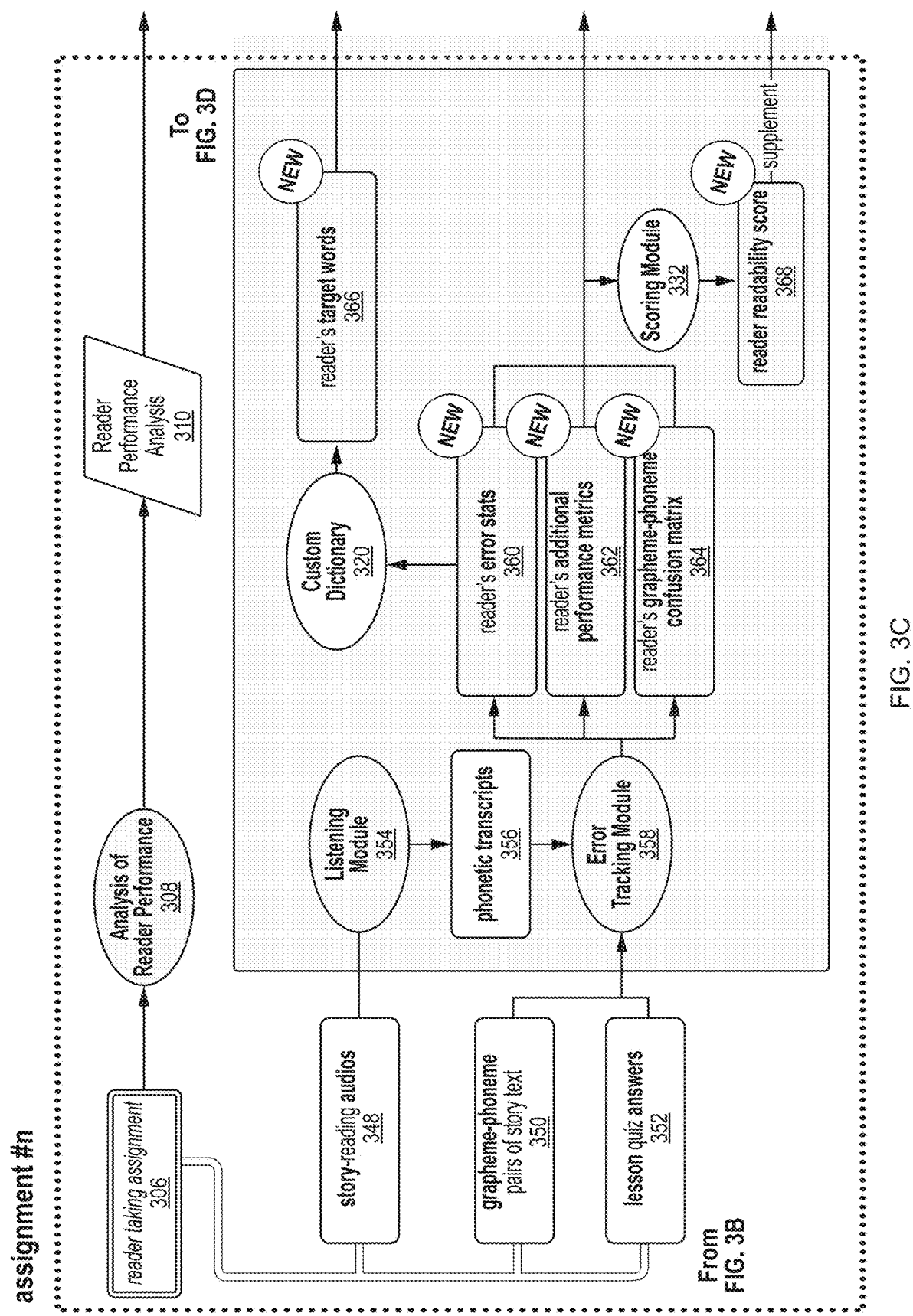

As described above, the reader performance analysis module 308 may receive, as input, one or more reader performance analyses of the specific reader 110 generated based on the specific reader 110's taking of one or more previous assignments. The left side of FIG. 3A shows an embodiment of a reader performance analysis module 318 which may generate such performance analyses. Although in practice the reader performance analysis module 308 and the reader performance analysis module 318 may be implemented as a single module, the reader performance analysis module 308 and the reader performance analysis module 318 are illustrated as separate modules in FIG. 3A to illustrate that the reader performance analysis module 318 generates one or more reader performance analyses based on the taking of one or more previous assignments by the specific reader 110. As this implies, anything disclosed herein in connection with the reader performance analysis module 318 may be applicable to the reader performance analysis module 308 and to the reader performance analysis module 208. For example, if the system 300 is generating assignment #2 for the specific reader 110, then the reader performance analysis module 318 may be used to implement the reader performance analysis module 208 to generate the reader performance analysis 210 for assignment #1. In other words, the reader performance analysis module 208 and the reader performance analysis module 318 may be the same module.

In general, the reader performance analysis module 318 may analyze any aspect(s) of the specific reader 110's performance on one or more previous assignments. Although the following description will refer to "the previous assignment" for ease of explanation, it should be understood that the reader performance analysis module 318 may operate on one or more previous assignments to generate output based on such one or more previous assignments.

The reader performance analysis module 318 may receive and/or generate reader error statistics 322 associated with the specific reader 110 based on the specific reader 110's performance when taking the previous assignment. The reader error statistics 322 may include, for example, the types and frequencies of reading errors the specific reader 110 made when taking the previous assignment, such as mispronunciations, omissions, and/or substitutions of graphemes and phonemes when taking lessons and/or reading stories. Although the reader error statistics 322 and various other statistics herein are referred to as "error" statistics, it should be understood that any such statistics may include statistics representing and/or based on correct reading (e.g., correct grapheme-to-phoneme decoding) by the specific reader 110. As such the "error" statistics disclosed herein (such as the reader error statistics 322) are not limited to representing or being based on errors of the specific reader 110. Such "error" statistics, when they represent or are based on correct decoding by the specific reader 110, may be understood more generally as "performance" statistics, rather than being limited only to "error" statistics.

The reader performance analysis module 318 may receive and/or generate additional performance metrics 324 associated with the specific reader 110 based on the specific reader 110's performance when taking the previous assignment. These may include the specific reader 110's reading speed (fluency), comprehension level, attention span, and/or response to different types of content or instructional strategies.

As another example, the additional performance metrics 324 may include data representing the time taken by the specific reader 110, to decode one or more graphemes into corresponding phonemes. For example, the reader performance analysis module 318 may include a timing mechanism that begins when a grapheme or a set of graphemes is presented to the specific reader 110 and which stops when the specific reader 110 successfully vocalizes or identifies the corresponding phoneme(s) (whether accurately or not). This mechanism may record, within the additional performance metrics 324, the duration (amount of time) taken by the specific reader 110 to perform the decoding process for one or more grapheme-phoneme pairs. The reader performance analysis module 318 may receive and/or generate a grapheme-phoneme confusion matrix 326 associated with the specific reader 110 based on the specific reader 110's performance when taking the previous assignment. The grapheme-phoneme confusion matrix 326 represents which grapheme-phoneme pairs the specific reader 110 has struggled with, indicating patterns of confusion and/or consistent mistakes. The grapheme-phoneme confusion matrix 326 may, for example, map the frequency and types of the specific reader 110's phonetic decoding errors against their corresponding graphemes. The grapheme-phoneme confusion matrix 326 is merely one way of implementing a grapheme-phoneme decoding analysis module, which represents patterns in grapheme-phoneme decoding by the specific reader 110. Therefore, it should be understood that any reference herein to the grapheme-phoneme confusion matrix 326 is equally applicable to other techniques for identifying and representing patterns of grapheme-phoneme decoding by the specific reader 110.

The reader performance analysis module 318 may identify target words 328 that the specific reader 110 has difficulty reading. The reader performance analysis module 318 may identify the target words 328 using any one or more of the reader error statistics 322, the additional performance metrics 324, and the grapheme-phoneme confusion matrix 326. For example, and as described in more detail below, the system 300 may include a custom dictionary 320, and the reader performance analysis module 318 may use the custom dictionary 320 to identify the target words 328 based on the reader error statistics 322, the additional performance metrics 324, and the grapheme-phoneme confusion matrix 326.

More specifically, the reader performance analysis module 318 may first categorize the errors made by the specific reader 110 into different types. These types may include, for example, mispronunciations, omissions, substitutions, etc., on a grapheme-phoneme level. A phoneme is a unit of sound. A grapheme is a letter or set of sequential letters that are associated with a corresponding phoneme. The reader performance analysis module 318 assigns a weight to each category of error. These weights reflect the relative importance or impact of each error type in understanding the specific reader 110's difficulties. For example, frequent mispronunciations might be weighted more heavily than occasional omissions.

Using the weights assigned to each error category, the reader performance analysis module 318 may calculate importance factors for each grapheme-phoneme pair. For example, the weighted errors associated with each pair may be aggregated to determine how problematic each pair is for the specific reader 110. Such aggregation may include, for example, using and combining the results of multiple models or methods to derive a robust set of importance factors.

The reader performance analysis module 318 may examines each word in the custom dictionary 320 (possibly after filtering words in the custom dictionary 320 by age of acquisition to ensure that only age-appropriate words are used in the subsequent steps). For each word, the reader performance analysis module 318 may allocate weights based on the importance factors of the grapheme-phoneme pairs that make up the word. Once each word has been assigned a weight, the words are ranked according to the sum of their importance factors—the total weight each word has received. Words with the highest total weights (i.e., those that sum up to the largest importance factors) may be identified as the target words 328. These are the words that the reader performance analysis module 318 has determined to be most challenging for the specific reader 110, based on their past errors and the calculated importance of the grapheme-phoneme pairs within those words.

In summary, the reader performance analysis module 318 uses a data-driven approach to pinpoint which words are most problematic for the specific reader 110 by analyzing their specific errors (e.g., on a grapheme-phoneme level), assigning importance to these errors, and then applying this analysis to identify challenging words in a structured and quantifiable way. This method helps tailor reading interventions or educational content to address the specific reader 110's specific areas of difficulty effectively.

The system 300 also includes a scoring module 332, which receives one or more of the reader error statistics 322, the additional performance metrics 324, and the grapheme-phoneme confusion matrix 326 as inputs, and generates a reader readability score 330 corresponding to the specific reader 110 as an output. The reader readability score 330 reflects the specific reader 110's reading ability and comfort level with various texts, helping to ensure that subsequent assignments are neither too easy nor too difficult.

The target words 328 and/or reader readability score 330 may, for example, form part of the output of the reader performance analysis module 318, which is received by the subsequent assignment generation module 302 and used by the subsequent assignment generation module 302 to generate the subsequent assignment 304.

For example, system 300 may include a story generation module 334, which may receive the target words 328 as input and generate, based on the target words 328, new stories 338 that include some or all of the target words 328. The scoring module 332 may receive the generated stories 338 as input and generate story readability scores 340 corresponding to the generated stories 338, where the story readability scores 340 may include a story readability score for each of the generated stories 338. The individual story readability scores 340 may be the same as or differ from each other in any of a variety of ways.

The subsequent assignment generation module 302 may use the story readability scores 340 in any of a variety of ways in the process of creating the subsequent assignment 304. For example, for each of the generated stories 338, the subsequent assignment generation module 302 may determine whether that story's story readability score is within a range of values that is acceptable in relation to the specific reader 110's reader readability score 330. Such a range may be selected and applied in any of a variety of ways. For example, a relatively conservative approach may be used, in which the floor for the reader readability score 330 is rounded down and the ceiling for the story readability score is rounded up. As another example, the subsequent assignment generation module 302 may only allocate stories which have a story readability score that is no more than some predetermined number of grade levels (e.g., 1 or 2) lower than the reader readability score 330.

If so, then the subsequent assignment generation module 302 includes the generated story within the stories in the subsequent assignment 304; otherwise, the subsequent assignment generation module 302 excludes the generated story from the stories in the subsequent assignment 304.

Integrating the story readability scores 340 into the assignment generation process offers numerous benefits, significantly enhancing the educational value of the assignments. One of the most notable advantages is the personalized learning experience it provides. By including or excluding stories based on their readability scores in relation to the specific reader 110's abilities, the system 300 ensures that each assignment is tailored to the systems 100's reading level. This personalization not only maintains an optimal challenge level but also encourages learning without causing frustration or disinterest. Moreover, the use of the story readability scores 340 in the assignment generation process enables the system 300 to implement a data-driven approach to content selection. This method relies on quantifiable metrics for decision-making, leading to more consistent and objective educational experiences compared to subjective judgments. Finally, the inclusion and exclusion of stories based on the story readability scores 340 creates a feedback loop for continuous improvement. As the system 300 gathers more data on the specific reader 110's performance, it can better adjust the story readability scores 340 and selection criteria, resulting in increasingly accurate personalization.

The system 300 may also include a plan generation module 336, which may perform functions such as selecting one or more repurposed stories 342 and one or more lessons 344 for use in the subsequent assignment 304.

The plan generation module 336 may receive, as input, any one or more of the reader error statistics 322, the additional performance metrics 324, the grapheme-phoneme confusion matrix 326, and the reader readability score 330. The plan generation module 336 may access a set of previously-generated stories (not shown), which may include, for example, both stories that the story generation module 334 previously generated for the specific reader 110 (as part of generating one or more assignments for the specific reader 110) and stories that the story generation module 334 previously generated for readers other than the specific reader 110 (as part of generating one or more assignments for those readers). The plan generation module 336 may select a subset (i.e., fewer than all) of the stories in the set of previously-generated stories, based on some or all of the inputs to the plan generation module 336. For example, the plan generation module 336 may select the subset to be suitable for the current reading grade level of the specific reader 110. The plan generation module 336 may, for example, filter the subset by removing from it any stories that the system 300 has included in any previous assignments for the specific reader 110. The plan generation module 336 may include the resulting subset of stories in the repurposed stories 342.

The plan generation module 336 may generate or otherwise select lessons for inclusion in the subsequent assignment 304 in any of a variety of ways. For example, the grapheme-phoneme confusion matrix 326 may include a set of grapheme-phoneme pairs, sorted in order of reading difficulty for the specific reader 110. When identifying the most suitable lessons 344 for the specific reader 110, the plan generation module 336 may initially identify a lesson that is based on the specific reader 110's most challenging grapheme-phoneme pair, as indicated by the grapheme-phoneme confusion matrix 326. The next lesson identified by the plan generation module 336 may be based on the next-most challenging grapheme-phoneme pair for the specific reader 110, and so on.

The subsequent assignment generation module 302 may include, in the subsequent assignment 304, both: (1) stories which include both the generated stories 338 and repurposed stories 342; and (2) the one or more lessons 344.

The integration of the plan generation module 336 into system 300, as described, offers several key benefits that enhance the educational framework and effectiveness of the assignments generated for specific readers. For example, the plan generation module 336 efficiently utilizes a repository of previously-generated stories and lessons. By selecting from both newly generated and repurposed content, the system 300 maximizes the use of available educational materials, ensuring that valuable resources are continually leveraged to enhance learning. Reuse of existing stories and lessons also reduces use of processing and memory resources by the system 300, which also enables the system 300 to generate and provide the subsequent assignment 304 to the specific reader 110 more quickly than would be possible if all stories and lessons within the subsequent assignment 304 need to be generated.

For example, the plan generation module 336 may search through the set of previously-generated stories mentioned above and attempt to identify, within that set of previously-generated stories, at least some minimum number of stories which are suitable for the specific reader 110 and which were not previously read by the specific reader 110. If the plan generation module 336 can find at least the minimum number of stories in this way, the plan generation module 336 may only select previously-generated stories for use in the subsequent assignment 304. In other words, if the plan generation module 336 can find at least the minimum number of stories in this way, then the system 300 may not use the story generation module 334 to generate any stories for use in the subsequent assignment 304. If the minimum number of stories cannot be identified in this way, the plan generation module 336 may use the story generation module 334 to generate one or more new stories, and then use a combination of previously-generated stories and new stories in the subsequent assignment 304. This method minimizes the need to generate new stories for use in the subsequent assignment 304 and thereby makes efficient use of processing and memory resources.

Furthermore, the plan generation module 336 tailors the educational content to the specific needs of the specific reader 110. By selecting stories and lessons based on the specific reader 110's current reading grade level and past performance (as indicated by inputs like reader error statistics, performance metrics, and the reader readability score), the plan generation module 336 ensures that each assignment is appropriately challenging and relevant.

The plan generation module 336 filters out any stories or lessons that have been previously used in assignments for the specific reader 110. This approach prevents redundancy, keeping the learning material fresh and engaging, which is crucial for maintaining the specific reader 110's interest and motivation.

The inclusion of various inputs into the plan generation module 336 creates a feedback loop, similar to that facilitated by the story readability score 340. This loop allows the system 300 to continuously refine its understanding of the specific reader 110's needs and adjust the educational content accordingly, fostering an environment of continuous improvement and personalized learning.

Once the subsequent assignment 304 has been generated, the system 300 may select stories and lessons for presentation to the specific reader 110 as part of taking the assignment 306 in any of a variety of ways. For example, the system 300 may be configured always to present all of the lessons in the subsequent assignment 304 to the specific reader 110 first, and then to present some or all of the stories in the subsequent assignment 304 to the specific reader 110. As another example, the system 300 may enable the specific reader 110 to provide input selecting whether to read a story within the subsequent assignment 304 or to take a lesson within the subsequent assignment 304. If the specific reader 110's input indicates that the specific reader 110 wishes to read a story, then the system 300 may present a story from the subsequent assignment 304 to the specific reader 110. If the specific reader's input indicates that the specific reader 110 wishes to take a lesson, then the system 300 may present a lesson from the subsequent assignment 304 to the specific reader 110. This process may repeat for any number of stories and lessons within the subsequent assignment 304. As this implies, the specific reader 110 may select, and the system 300 may present to the specific reader 110, any combination of stories and lessons from the subsequent assignment 304 to the specific reader 110 in any sequence. As yet another example, the subsequent assignment 304 itself may specify a particular sequence of lessons and stories, and the system 300 may present the lessons and stories within the subsequent assignment 304 to the specific reader 110 in the specified sequence.

One example of a type of lesson that may be included in the subsequent assignment 304 is a word quiz. Any particular word quiz lesson may focus on one grapheme-phoneme pair. For example, the plan generation module 336 may select a grapheme-phoneme pair from the grapheme-phoneme confusion matrix 326 (e.g., the grapheme-phoneme pair that is most difficult for the specific reader 110, as indicated by the grapheme-phoneme confusion matrix 326) and generate or select a lesson that focuses on the selected grapheme-phoneme pair. For example, the plan generation module 336 may select a few (e.g., 3, 4, or 5) words that contain the selected grapheme-phoneme pair, and generate or select a story containing the selected words. The system 300 may display the story one sentence at a time. While each sentence is displayed, the specific reader 110 may speak the sentence aloud. In response to the specific reader 110 selecting any word in a displayed sentence, the system 300 may speak the individual phonemes the selected word sequentially in any manner disclosed herein. In response to the specific reader 110 selecting any displayed sentence, the system 300 may speak the selected sentence aloud in any manner disclosed herein.

After presenting the story sentence-by-sentence in this way, the system 300 may display the entire story at once and prompt the specific reader 110 to select all words that contain the selected grapheme-phoneme pair. The specific reader 110 may then provide input selecting a plurality of graphemes in the displayed story. The system 300 may identify any correct graphemes selected by the specific reader 110, any incorrect graphemes selected by the specific reader 110, and any graphemes in the selected grapheme-phoneme pair that the specific reader 110 failed to select.

The system 300 also includes a text-to-speech module 346. As will be described in more detail below, the text-to-speech module 346 may be a custom text-to-speech module which performs certain functions that are unique to embodiments of the present invention. As the specific reader 110 is taking the assignment 306, in response to the specific reader 110 clicking on or otherwise selecting a displayed word in a story or lesson, the text-to-speech module 346 may say aloud (i.e., generate audio output representing) each of the phonemes in the selected word sequentially. While each such phoneme is being spoken aloud by the text-to-speech module 346, the text-to-speech module 346 may also emphasize (e.g., by highlighting, bolding, underlining, or changing the color of) the text of the grapheme that corresponds to that phoneme, and de-emphasize the grapheme that corresponds to that phoneme while that phoneme is not being spoken aloud. In addition, after speaking aloud all of the phonemes in the selected word sequentially, the text-to-speech module 346 may speak aloud the entire selected word, and may also emphasize the entire selected word while speaking aloud the entire selected word. Examples of this process will be described in more detail below.

Furthermore, as the specific reader 110 is taking the assignment 306, in response to the specific reader 110 clicking on or otherwise selecting a displayed sentence in a story or lesson (such as by clicking or tapping on an area outside of the displayed text of the sentence, rather than on the displayed text of the sentence), the text-to-speech module 346 may say aloud (i.e., generate audio output representing) the entire selected sentence. Examples of this process will be described in more detail below.

The inclusion of the custom text-to-speech module 346 in system 300 provides several significant benefits, particularly in enhancing the learning experience for the specific reader 110. For example, the ability to provide phoneme-by-phoneme guidance in both audio and visual formats engages multiple senses, which can greatly enhance learning and retention. This multisensory approach helps to reinforce the connection between the visual representation of words (graphemes) and their auditory sounds (phonemes), which is crucial for developing reading and pronunciation skills. Furthermore, text-to-speech module 346 allows for personalized interaction with text. As the specific reader 110 selects words or sentences, they receive immediate, tailored feedback. This mimics one-on-one tutoring, providing the benefits of individualized learning without the need for a human tutor present at every session.

As described in more detail below, one aspect of the specific reader 110 taking the assignment 306 includes the stories in the subsequent assignment 304 being displayed to the specific reader 110, and the specific reader 110 reading those stories aloud. As the specific reader 110 reads the stories aloud, the specific reader 110's speech is captured (e.g., using one or more microphones) to generate audio data representing the specific reader 110's speech. Such audio data is referred to herein and shown in FIGS. 3A-3D as story-reading audios 348.

For some or all of the stories in the subsequent assignment 304, the system 300 may generate or otherwise identify grapheme-phoneme pairs for some or all of the words in the story. Those grapheme-phoneme pairs are referred to herein and shown in FIGS. 3A-3D as grapheme-phoneme pairs of story text 350. The system 300 may correlate the grapheme-phoneme pairs with the corresponding story text in any of a variety of ways. For example, each grapheme in the story text may have a pointer to the corresponding grapheme-phoneme pair in the grapheme-phoneme pairs 350, and/or vice versa.

As described in more detail below, one aspect of the specific reader 110 taking the assignment 306 includes the system 300 interactively providing the lessons in the subsequent assignment 304 to the specific reader 110, which may include, for example, generating visual (e.g., textual) and/or auditory output to the specific reader 110 based on the lessons, and receiving input (e.g., textual, selection, and/or speech) from the specific reader 110. As a particular example, as part of the specific reader 110 taking a particular lesson, the system 300 may, as part of a lesson, display a particular word to the specific reader 110, and the speaker may speak the word aloud. As another example, the system 300 may, as part of a lesson, display text to the specific reader 110 and ask the specific reader 110 to select all words within that text which contain graphemes corresponding to a specified phoneme, in response to which the specific reader 110 may select (e.g., tap or click on) one or more words within that text. All such user inputs are examples of what are referred to herein and shown in FIGS. 3A-3D as lesson quiz answers 352.

The system 300 also includes a listening module 354. The listening module 354 receives the story-reading audios 348 as input and generates phonetic transcripts 356 of the story-reading audios 348. Examples of techniques that the listening module 354 may use to generate the phonetic transcripts 356 are described in more detail below.

The system 300 also includes an error tracking module 358. The error tracking module 358 receives the phonetic transcripts 356, the grapheme-phoneme pairs of the story text 350, and the lesson quiz answers 352 as input, and generates updated reader error statistics 360 associated with the specific reader 110 as output. The updated reader error statistics 360 may be an updated version of the specific reader 110's previous reader error statistics 322.

The error tracking module 358 may also generate, based on its inputs, updated additional performance metrics 362 associated with the specific reader 110 and/or an updated grapheme-phoneme confusion matrix 364 associated with the specific reader 110. The updated additional performance metrics 362 may be an updated version of the additional performance metrics 324. The updated grapheme-phoneme confusion matrix 364 may be an updated version of the grapheme-phoneme confusion matrix 326.

The custom dictionary 320 may receive, as inputs, the updated reader error statistics 360, the updated additional performance metrics 362, and the updated grapheme-phoneme confusion matrix 364, and generate, based on those inputs, updated target words 366, which may be an updated version of the target words 328.

The repeated updating of reader error statistics 360, additional performance metrics 362, grapheme-phoneme confusion matrix 364, and target words 328 is a sophisticated approach that significantly enhances the learning process. Each component plays a crucial role in tailoring and optimizing the educational experience for the specific reader 110. For example, updating the updated reader error statistics 360 enables the system 300 to identify patterns or recurring problems in the specific reader 110's reading, which educators and the system 300 itself may use to pinpoint specific areas where the specific reader 110 needs more practice or different strategies, leading to more focused and effective interventions. Updating the updated additional performance metrics 362 enables the system 300 to monitor the specific reader 110's progress over time and adjust the difficulty level of assignments accordingly. Updating the updated grapheme-phoneme confusion matrix 364 allows the system 300 to keep current with the specific reader 110's phonetic challenges, which can in turn enable the 300 to target these weak spots specifically, thereby improving phonetic decoding skills, which are foundational to reading. Finally, updating the target words 328 can be used to ensure that the specific reader 110 is spending time on the most impactful areas, which can accelerate learning and improve overall reading skills more efficiently. In summary, the continuous updating of these data structures forms a feedback loop that enhances the adaptiveness and effectiveness of the system 300, making it capable of meeting the unique and changing needs of each reader.

The scoring module 332 may receive one or more of the updated reader error statistics 360, the updated additional performance metrics 362, and the updated grapheme-phoneme confusion matrix 364 as inputs, and generate an updated reader readability score 368 corresponding to the specific reader 110 as an output. The updated reader readability score 368 reflects the specific reader 110's current reading ability and comfort level with various texts. The updated reader readability score 368 may be an updated version of the reader readability score 330.

The updated target words 366 may be provided as an input to the story generation module 334 for use in the generation of the next assignment (i.e., in the next iteration of the method shown in FIGS. 3A-3D). Similarly, the updated reader error statistics 360 the updated additional performance metrics 362, the updated grapheme-phoneme confusion matrix 364, and the updated reader readability score 368 may be provided as inputs to the plan generation module 336 for use in the generation of the next assignment (i.e., in the next iteration of the method shown in FIGS. 3A-3D).

Figure 4:
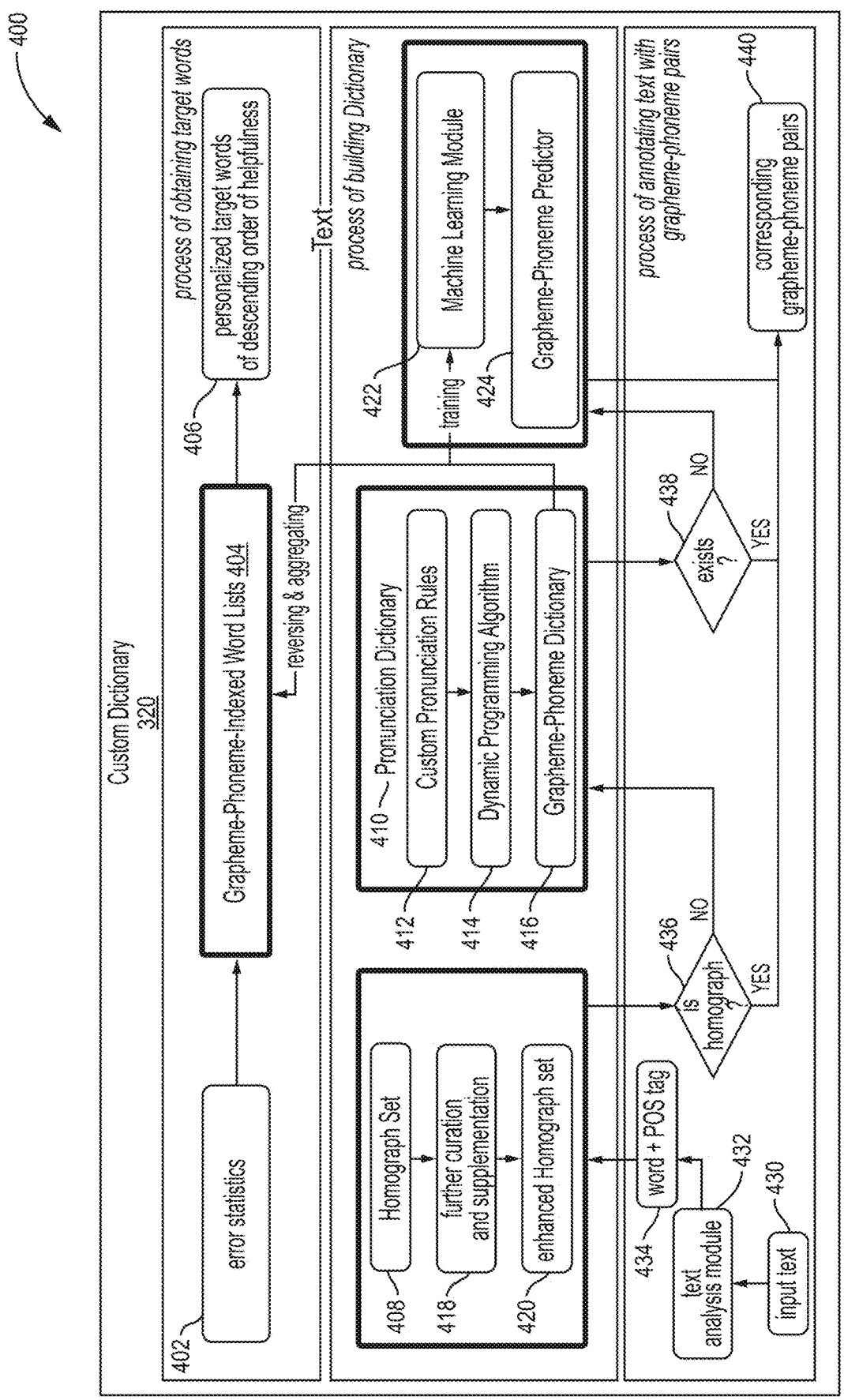
FIG. 4 is a diagram of a system which illustrates the structure and methods of operation of a custom dictionary in more detail according to one embodiment of the present invention.

Referring to FIG. 4, a diagram is shown of a system 400 which illustrates the structure and methods of operation of the custom dictionary 320 in more detail according to various embodiments of the present invention. As mentioned above, the custom dictionary 320 contains definitions (also referred to herein as "entries") for grapheme-phoneme pairs for each of a plurality of words. A grapheme is a unit of written language that represents a phoneme, which is the smallest unit of sound in speech. For example, in the word "cat," the graphemes are 'c,' 'a,' and 't,' and they correspond to the phonemes /k/, /æ/, and /t/, respectively. A word that has a definition in the dictionary is said to be "in" the dictionary.

The custom dictionary 320 may include entries for a large number of words in a language, such as English. In one embodiment, this number is approximately 130,000. As other examples, the custom dictionary 320 may include entries for at least 20,000 words, for at least 50,000 words, for at least 100,000 words, or for at least 150,000 words.

For every word in the custom dictionary 320, the custom dictionary 320 may include data representing the age appropriateness of the word, i.e., the age(s) at which the word is typically suitable for a reader's reading level. The custom dictionary 320 may also contain, for each of a plurality of reading age levels, some number (e.g., 50) of the most common words for readers at that reading age level, thereby providing a targeted vocabulary that aligns with the developmental stage of the reader.

The custom dictionary 320 may be generated and/or updated as follows. The system 400 may include a pronunciation dictionary 410, such as the Carnegie Mellon University (CMU) Pronunciation Dictionary. The pronunciation dictionary 410 includes a large number of words in a particular language (such as English) and phonetic transcriptions of those words. The system 400 also includes a set of custom pronunciation rules 412, which may, for example, have been hand-crafted (manually created). The custom pronunciation rules 412 may, for example, be based on and represent linguistic knowledge about phonology and orthography in a particular language (e.g., English), which dictate how letters and letter combinations (graphemes) correspond to sounds (phonemes). The system 400 also includes a dynamic programming algorithm 414 which is adapted to receive a word as input and to generate, as output, the most likely sequence of grapheme-phoneme pairs that spell out the entire word and match the entire phoneme sequence. The dynamic programming algorithm 414 is executed to generate a grapheme-phoneme dictionary 416, which includes a set of word to grapheme-phoneme mappings for a plurality of words.

The dynamic programming algorithm 414 may, for example, include a set of rules that search for different pronunciation patterns individually, such as single-letter/multi-letter graphemes to single/multiple phoneme patterns. Executing the dynamic programming algorithm 414 may include performing a search for a word's matching grapheme-phoneme sequence on a single grapheme-phoneme pair level. Such a search may include searching for a word's grapheme-phoneme sequence repetitively until the dynamic programming algorithm 414: (1) reaches the end of the word's phoneme sequence, and (2) the graphemes from the search results (grapheme-phoneme pairs) can sequentially reconstruct the original word. In each step, the dynamic programming algorithm 414 takes one of the previously-obtained result candidates that builds up the grapheme-phoneme sequence of the prefix of the word, and performs a search to go through the above-mentioned rules. If there is any hit, the dynamic programming algorithm 414 moves one step further and uses the hit as a later candidate to start from in the next run. If there is no hit, however, the current candidate would be eliminated from the search scope.

The system 400 also includes a homograph set 408 for a particular language, such as English. An example of the homograph set 408 is the John Higgins English Homograph Set. Homographs are words that are spelled the same but have different pronunciations depending on their part of speech (POS) in a sentence (e.g., "lead" as a verb /liːd/ and "lead" as a noun /lɛd/). The homograph set 408 may be further curated and supplemented 418 to create an enhanced homograph set 420, in which, for each of a plurality of words, multiple pronunciations of that word are distinguished by their part of speech (POS).

To cover words not included in the grapheme-phoneme dictionary 416 (out-of-vocabulary cases), a machine learning model 422 may be trained on the words in the grapheme-phoneme dictionary 416. The training process involves learning the patterns and rules from the existing mappings of graphemes to phonemes within the grapheme-phoneme dictionary 416. The resulting model 422 assimilates how different graphemes (or combinations of graphemes) correspond to phonemes across various words. The system 400 may use the model 422 to create a grapheme-phoneme predictor 424 that is adapted to predict grapheme-phoneme mappings for new words (i.e., words not contained in the grapheme-phoneme dictionary 416).

Once the elements of the system 400 described above have been configured, the system 400 may use those elements to map a word or sentence to a sequence of grapheme-phoneme pairs. Although the following description refers to processing a sentence, the system 400 may similarly be applied to any unit of text, such as a word, phrase, or paragraph. The following description refers to any such as text as the input text 430 for ease of explanation.

The system 400 includes a text analysis module 432, such as the Natural Language Toolkit (NLTK), which receives the input text 430 as input, and analyzes the input text 430 to generate output 434 based on the input text 430. The text analysis module 432 may, for example, perform any of a variety of language processing tasks on the input text 430, such as part-of-speech (POS) tagging, in which the text analysis module 432 assigns a part-of-speech tag to some or all of the words in the input text 430. The output 434 may include such POS tags, and either includes the corresponding words as well or contain pointers to such words (e.g., in the input text 430).

For each word in the input text 430, the system 400 may use the output 434 and the enhanced homograph set 420 to determine whether that word is a homograph, such as by determining whether the word and its corresponding POS satisfy the criteria for being a homograph, as indicated by the enhanced homograph set 420 (operation 436). If the enhanced homograph set indicates that the word is a homograph, then the system 400 retrieves the grapheme-phoneme mapping for the word from the enhanced homograph set 420 based on the word's POS tag. This ensures that words with multiple pronunciations are pronounced correctly according to their usage in the sentence. The result is a sequence of grapheme-phoneme pairs 440, corresponding to the input text 430, that has been retrieved from the enhanced homograph set 420.

If the enhanced homograph set 420 does not indicate that the word is a homograph, then the system 400 attempts to use the grapheme-phoneme dictionary 416 to map the word to its corresponding grapheme-phoneme pairs (operation 438). If a mapping from the word to its corresponding grapheme-phoneme pairs exists in the grapheme-phoneme dictionary 416, then the system 400 extracts the grapheme-phoneme pairs corresponding to the word from the grapheme-phoneme dictionary 416. These are used as the sequence of grapheme-phoneme pairs 440 corresponding to the input text 430 in this case.

If no mapping from the word to its corresponding grapheme-phoneme pairs exists in the grapheme-phoneme dictionary 416 (i.e., the word is an out-of-vocabulary word), the system 400 employs the grapheme-phoneme predictor 424 to identify the sequence of grapheme-phoneme pairs 440 corresponding to the input text 430.

In this way, the system 400 identifies a sequence of grapheme-phoneme pairs 440 corresponding to the input text 430, whether by using the enhanced homograph set 420, the grapheme-phoneme dictionary 416, or the grapheme-phoneme predictor 424.

Any reference herein to using the custom dictionary 320 to identify a sequence of grapheme-phoneme pairs corresponding to particular text (e.g., a word, sentence, paragraph, or story/document) may be implemented by using the techniques just described.

The techniques shown in FIG. 4 and described above for identifying a sequence of grapheme-phoneme pairs corresponding to the input text 430 offers several significant benefits, making it a highly effective and versatile approach in linguistic technology applications. These benefits enhance its value in educational, communicative, and technological contexts.

For example, the ability of the system 400 to differentiate and correctly pronounce homographs based on their part-of-speech (POS) tags ensures a high level of accuracy in speech synthesis and reading applications. By utilizing the enhanced homograph set 420, the system 400 may select the appropriate pronunciation for words that have multiple pronunciations depending on their grammatical usage, thereby mimicking a more natural, human-like understanding of language nuances.

The integration of the grapheme-phoneme dictionary 416 with entries for a vast number of words allows the system 400 to cover a broad spectrum of the language's vocabulary. This extensive coverage ensures that the system 400 can handle a wide variety of texts without frequent recourse to external resources, making it highly reliable for real-time applications.

The inclusion of the grapheme-phoneme predictor 424, trained on the grapheme-phoneme mappings from the grapheme-phoneme dictionary 416, equips the system 400 to effectively handle words that are not included in the grapheme-phoneme dictionary 416 (out-of-vocabulary words). This capability is valuable for adapting to new words and evolving language use, ensuring the system 400 remains current and functional across different linguistic settings and time periods.

The system 400's architecture supports continuous learning and updating, which is highly valuable in the dynamic field of language processing. As new words become common or as usage patterns evolve, the system 400 may adapt by updating the grapheme-phoneme dictionary 416 and retraining the grapheme-phoneme predictor 424 in light of such new words. This adaptability ensures long-term relevance and utility of the system.

The described methodology for identifying the sequence of grapheme-phoneme pairs 440 corresponding to a word in the input text 430, by sequentially utilizing the enhanced homograph set 420, the grapheme-phoneme dictionary 416, and finally the grapheme-phoneme predictor 424, serves a strategic purpose and offers multiple benefits. This hierarchical approach to phoneme mapping is designed to maximize accuracy, efficiency, and adaptability in processing diverse linguistic inputs.

For example, this sequential approach to identifying the sequence of grapheme-phoneme pairs 440 ensures the highest possible accuracy in phoneme mapping while optimizing the system 400's performance across various linguistic scenarios. This method leverages the strengths of different linguistic resources systematically, ensuring that each type of text input is processed using the most appropriate tool available, thereby enhancing overall system effectiveness.

In particular, the initial use of the enhanced homograph set 420 allows the system 400 to accurately address the complexity of homographs. By prioritizing this set, the system 400 ensures that such words are pronounced correctly according to their usage in a sentence, reflecting a nuanced understanding of language that mimics human speech patterns. If a word is not found in the enhanced homograph set 420, the system 400 next consults the grapheme-phoneme dictionary 416. This dictionary 416 includes a comprehensive list of words and their corresponding phoneme mappings, providing broad coverage for common and uncommon words alike. This step ensures that most words can be accurately pronounced using a reliable, pre-established mapping, thereby maintaining high accuracy for the majority of text inputs.

Only for words that are not included in the enhanced homograph set 420 or the grapheme-phoneme dictionary 416, the system 400 employs the grapheme-phoneme predictor 424. This predictor 424 uses machine learning techniques to infer phoneme mappings based on learned patterns and rules. This capability is valuable for handling novel, rare, or evolving language use, ensuring the system 400 remains effective even for unusual words and as language changes over time.

By structuring the process to first attempt to use the most specific and accurate resources (i.e., the enhanced homograph set 420 and grapheme-phoneme dictionary 416) before employing the more computationally intensive grapheme-phoneme predictor 424, the system 400 optimizes resource (processing and memory) utilization. This approach reduces unnecessary computational overhead, leading to faster processing times and lower resource consumption. This sequential methodology allows for easy scalability and updates. As new words are added to the language or as usage patterns evolve, the system 400 may be updated at various levels—such as enhancing the enhanced homograph set 420, expanding the grapheme-phoneme dictionary 416, or retraining the grapheme-phoneme predictor 424—without needing a complete overhaul, thereby ensuring long-term sustainability and adaptability.

The system 400 may also use the custom dictionary 320 to generate or otherwise identify personalized target words 406 for the specific reader 110 (e.g., words for which the specific reader 110 most needs to improve the ability to read accurately). The previous target words 328 and the updated target words 366 shown in FIGS. 3A-3D are examples of the personalized target words 406 shown in FIG. 4.

To generate the personalized target words 406, the system 400 may receive error statistics 402 for the specific reader 110. The error statistics 402 detail the specific reader 110's reading performance at the grapheme-phoneme level, such as by indicating particular phonemes the specific reader 110 is struggling to pronounce correctly. The previous reader error statistics 322 and the updated reader error statistics 360 shown in FIGS. 3A-3D are examples of the error statistics 402.

The system 400 includes a set of word lists that are indexed according to grapheme-phoneme pairs, which are shown in FIG. 4 as grapheme-phoneme-indexes word lists 404. This means that, for each of a plurality of grapheme-phoneme pairs, the grapheme-phoneme-indexes word lists 404 includes that pair and a corresponding list of words that contain that pair.

The system 400 matches the specific reader 110's error statistics 402 with the grapheme-phoneme-indexed word lists 404. For example, the system 400 may align or correlate the phonemes that the specific reader 110 struggles with (as identified in the error statistics 402) to the corresponding word lists in the as grapheme-phoneme-indexes word lists 404. By doing so, the system 400 identifies which lists are most relevant to the specific reader 110's current reading challenges.

Based on the word lists identified by the matching step above, the system 400 generates the personalized target words 406. The personalized target words 406 are specifically chosen to address the grapheme-phoneme pairs the specific reader 110 has had difficulty with. The system 400 may order the personalized target words 406 in descending order of helpfulness. This ordering may, for example, be determined by the frequency and severity of the errors made by the specific reader 110 (as indicated in the error statistics 402), as well as the educational value of practicing each word. The system 400 may place words that are deemed most beneficial for the specific reader 110 to practice, based on the error statistics 402, at the top of the list of personalized target words 406.

The above-described process for generating personalized target words 406 for a specific reader 110, as implemented by system 400, serves a valuable role in enhancing reading accuracy and fluency through tailored educational interventions. This process is designed to identify and address the unique challenges faced by individual readers, particularly in their ability to correctly pronounce and understand words at the grapheme-phoneme level.

For example, the generation of personalized target words 406 enables embodiments of the present invention to provide individualized reading assistance that directly targets the phonetic difficulties encountered by the specific reader 110. By customizing the learning material to the specific reader 110's specific needs, the system 400 ensures more effective and efficient learning outcomes, thereby accelerating the specific reader 110's improvement in reading skills. Furthermore, the system 400 uses the error statistics 402, which detail the specific reader 110's specific difficulties with grapheme-phoneme pairs, to tailor the reading material. This customization ensures that the specific reader 110's is practicing with words that are most relevant to their learning needs, thereby making the learning experience highly relevant and focused. The use of detailed error statistics to guide the generation of the personalized target words 406 ensures that the interventions are data-driven and grounded in actual performance metrics. This scientific approach to educational content generation maximizes the likelihood of successful learning outcomes.

Figure 5:
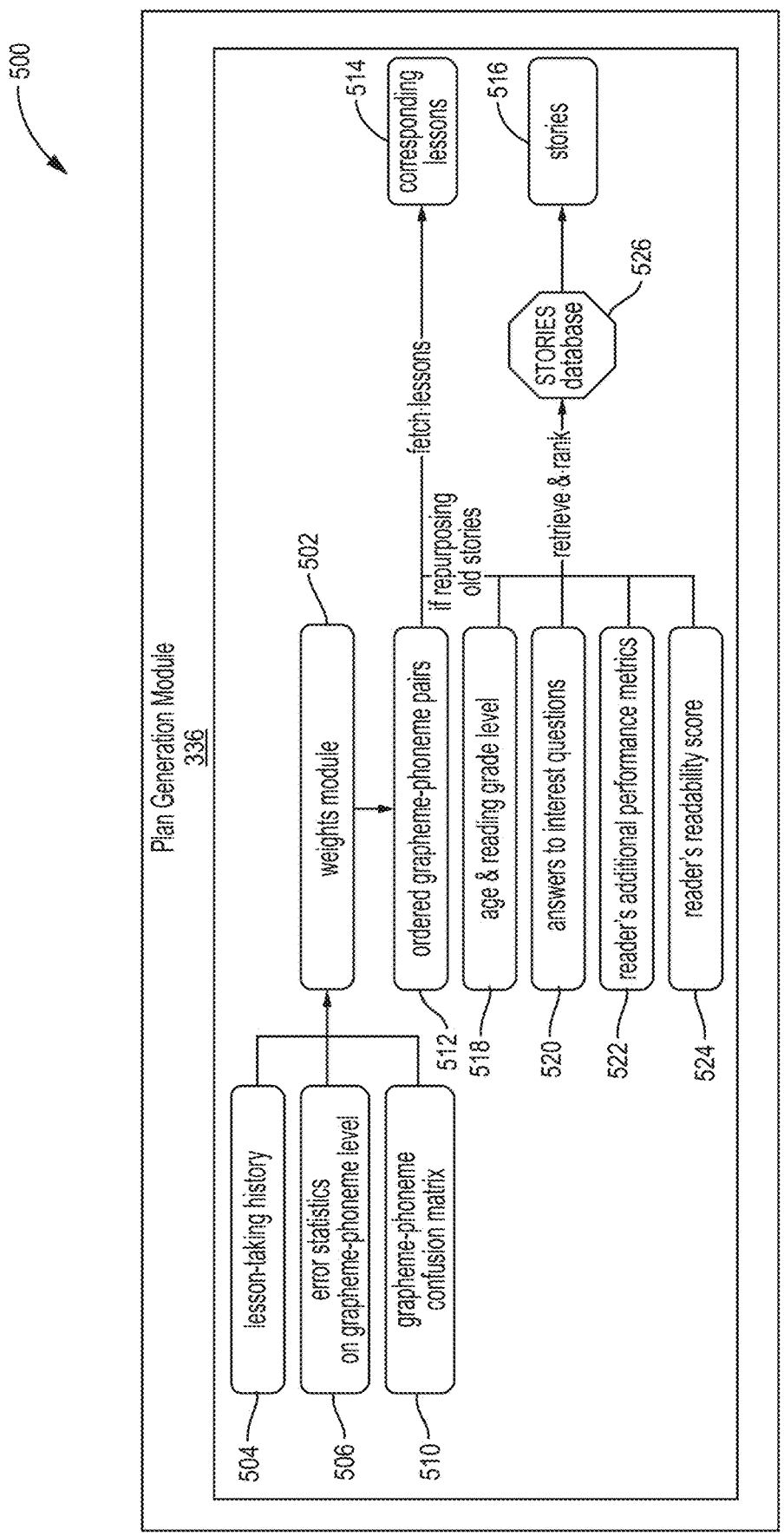
FIG. 5 is a diagram of a system including a plan generation module according to one embodiment of the present invention.

Referring to FIG. 5, an embodiment of a system 500 including the plan generation module 336 is shown. In general, the plan generation module 336 generates assignments (which include lessons and stories) that are customized for the specific learning needs and preferences of individual readers, such as the specific reader 110.

The plan generation module 336 includes a weights module 502, which is responsible for analyzing various inputs related to the specific reader 110's learning history and performance to generate a customized learning path. The inputs processed by the weights module 502 include:

The specific reader 110's lesson-taking history 504. This may include any of a variety of information about the lessons the specific reader 110 has previously taken, such as an ordered lists of the lessons' unique lesson identifiers (IDs) and a time at which each lesson was taken.

The specific reader 110's error statistics on a grapheme-phoneme level 506. This data provides insight into the specific areas where the specific reader 110 may be struggling with phonics, such as particular sounds or letter combinations. As described elsewhere herein, the grapheme-phoneme level 506 may include statistics that represent or are based on correct grapheme-phoneme decoding by the specific reader 110, and may therefore more generally be considered to be performance statistics, rather than merely error statistics.

The specific reader 110's grapheme-phoneme confusion matrix 510: This may include data representing the specific reader 110's confusion between graphemes and phonemes, highlighting specific patterns of errors.

Based on these inputs, the weights module 502 generates an ordered list of grapheme-phoneme pairs 512 that guides the selection of lessons in the assignment. The weights module 502 may, for example, include a tunable set of hyperparameters, which may be adjusted manually or algorithmically optimized (regressed) to fit the data collected within the system 400. This flexibility allows the system 400 to adapt and refine its approach based on actual usage and performance data. The system 400 may allow educators to customize the hyperparameters according to their preferences. This may include, for example, setting preferences for penalizing specific types of errors, focusing on particular grapheme-phoneme pairs, or addressing the co-occurrences of multiple grapheme-phoneme pairs. This level of customization ensures that the educational content can be tailored to address specific learning objectives or challenges identified by educators.

The plan generation module 336 takes the ordered set of grapheme-phoneme pairs 512 and retrieves corresponding lessons 514 from a database of existing lessons. Each lesson in this database may be tagged or indexed by the grapheme-phoneme pairs it addresses. This indexing allows for quick and accurate retrieval of lessons 514 based on specific phonetic content. The order or retrieval may be influenced by the order of the grapheme-phoneme pairs in the ordered list of grapheme-phoneme pairs 512, ensuring that lessons addressing more critical or challenging pairs are prioritized. Additionally or alternatively, the lessons 514 may be ordered post-retrieval to in a sequence that aligns with the specific reader 110's learning needs, as indicated by the ordered list of grapheme-phoneme pairs 512. In particular, the lessons 514 may be selected to favor grapheme-phoneme pairs that have high weights according to the ordered list of grapheme-phoneme pairs 512.

Furthermore, the plan generation module 336 may incorporate one or more stories 516 into the specific reader 110's assignment. In particular, the plan generation module 336 may select the stories 516 from a stories database 526, and order the stories 516 within the assignment based on one or more of the following factors, in any combination:

- The specific reader 110's age and reading grade level 518. This ensures that the 516 stories are age-appropriate and match the specific reader 110's reading proficiency.
- The specific reader 110's answers to interest questions 520. This allows for the inclusion of stories that align with the specific reader 110's interests, thereby increasing engagement and motivation.
- The specific reader 110's additional performance metrics 522. These may include, for example, various measures of the specific reader 110's reading abilities and progress, which help in choosing stories that are neither too easy nor too challenging.
- The specific reader 110's readability score 524. This is a metric which assesses the complexity of the text, ensuring that the stories 516 are well-suited to the specific reader 110's current reading level.

By combining the factors listed above, the plan generation module 336 is able to select, from the stories database 526, a highly personalized set of stories 516 that not only cater to the specific reader 110's reading level and interests but also reinforce the phonics concepts targeted in the lessons 514.

Embodiments of the plan generation module 336 may use not only previously-generated ("repurposed") stories retrieved from the stories database 526, but also generate new stories and include such new stories in the specific reader 110's assignment. For example, for each of the repurposed stories 516 retrieved from the stories database 526, the plan generation module 336 may calculate a relevance score. This score may be determined based on how closely the reading level of the story matches the reading level of the specific reader 110. Factors influencing this score may include, for example, the complexity of the language, the length of the story, vocabulary usage, and syntactic structures, compared against the specific reader 110's known reading abilities and comprehension skills.

A threshold for relevance scores may be set as a tunable parameter. This threshold may be manually adjusted by educators or automatically optimized by the system 500 based on aggregated performance data and learning outcomes. The purpose of the threshold is to ensure that only stories that are sufficiently challenging and appropriate for the specific reader 110's level are considered for inclusion in the assignment.

The plan generation module 336 filters out (does not include in the assignment) any stories whose relevance scores fall below the set threshold. After filtering, the plan generation module 336 determines whether there are enough stories remaining (i.e., with relevance scores above the threshold) to meet the educational needs of the specific reader 110. For example, this may include determining whether the number of remaining stories is greater than some previously-determined number of stories to include in the specific reader 110's assignment.

If the filtered set of stories from the database 526 is insufficient, the plan generation module 336 uses the story generation module 334 (see FIGS. 3A-3D), which may operate in any of the ways disclosed herein to generate one or more new, customized stories for the specific reader 110. The plan generation module 336 add such generated stories to the specific reader 110's assignment. As a result, that assignment may include both the repurposed stories and one or more newly-generated stories.

The above-described process used by the plan generation module 336 to select and/or generate stories for use in the specific reader 110's assignment offers several significant advantages that enhance the educational experience for specific readers, such as specific reader 110. For example, the process allows for a high degree of personalization in the learning materials provided to the specific reader 110. By calculating a relevance score for each story based on factors such as language complexity, story length, vocabulary usage, and syntactic structures, the plan generation module 336 ensures that the content closely matches the specific reader 110's reading level and abilities. This tailored approach helps in maintaining an optimal challenge level, promoting better engagement and more effective learning.

The use of a tunable threshold for relevance scores enables dynamic adjustment of the content based on the specific reader 110's progress and changing needs. Educators can manually adjust this threshold or allow the plan generation module 336 to automatically optimize it based on aggregated performance data and learning outcomes. This flexibility ensures that the educational content remains appropriately challenging as the specific reader 110's skills develop.

By incorporating the capability to generate new stories when the available repurposed stories from the database 526 do not meet the threshold criteria or are insufficient in number, the plan generation module 336 guarantees a continuous supply of suitable educational content. This is particularly beneficial in scenarios where the specific reader 110's needs are highly specific or when existing materials are limited in scope or depth. The ability to include both repurposed stories and newly generated stories in the specific reader 110's assignment enriches the learning material. This combination allows for a broader range of content, catering to various aspects of reading and comprehension skills. It also introduces variety, which can help maintain the reader's interest and motivation over longer periods.

Lessons within the lessons 514 may take any of a variety of forms. For the sake of example, assume that the specific reader 110 is having difficulty pronouncing the grapheme "c" with phoneme /k/ (in IPA, or "K" in ARPAbet) as in "cat." The following are examples of lessons that the plan generation module 336 may generated and included within the lessons 514 to help the specific reader 110 in this case.

A first such lesson may help the specific reader 110 with grapheme identification and pronunciation. When the specific reader 110 takes such a lesson (as part of taking the assignment 306), the system 300 may display the grapheme 'c' on the screen, which corresponds to the target phoneme /k/, as defined by the custom dictionary 320. Upon the specific reader 110 clicking on the displayed grapheme 'c', the system 300 may generate synthetic speech to audibly represent the phoneme /k/. This helps the specific reader 110 associate the visual representation with the correct sound.

A second such lesson may help the specific reader 110 practice word pronunciation. When the specific reader 110 takes such a lesson (as part of taking the assignment 306), the system 300 may display an example word that contains the target grapheme, such as "cat." When the specific reader 110 selects the word "cat," the system 300 may generate synthetic speech to pronounce the selected word, thereby providing an example of how the phoneme /k/ sounds within the context of a full word.

A third such lesson may help the specific reader 110 practice story interaction and phoneme recognition. When the specific reader 110 takes such a lesson (as part of taking the assignment 306), the system 300 may generate a story that includes multiple instances of words containing the phoneme /k/. The system 300 may display text of the story to the specific reader 110. The system 300 may prompt the specific reader 110 to select (e.g., click on) all instances of words in the story that contain the grapheme "c" (referred to herein as the "target grapheme") that are pronounced as phoneme /k/ (referred to herein as the "target phoneme"). The combination of the target grapheme and the target phoneme are referred to herein as the "target grapheme-phoneme pair." Only selections by the specific reader 110 of the target grapheme (e.g., "c") which are pronounced as the target phoneme (e.g., /k/) are treated as correct answers. Note that the story may be generated to include some words that contain the same grapheme (e.g., "c"), but which are pronounced differently (e.g., "c" as in "certain"), or the same phoneme but different graphemes (e.g., "K" with "k" as in "Korea" or with "ch" as in "stomach"), with the intent of testing whether the specific reader 110 is confused by such words. If the specific reader 110 selects any target graphemes which are not pronounced as the target phoneme, or selects any graphemes which are pronounced as the target phoneme, but which are not the target grapheme, the system 300 treats such selects as incorrect answers. Once the specific reader 110 completes the task, the system 300 generates and provides feedback to the specific reader 110 on their performance. This may include, for example, highlighting any words that the specific reader 110 correctly identified (true positives), any words containing the target grapheme-phoneme pair ("c"–"K") that the specific reader 110 missed (false negatives), and any words the specific reader 110 incorrectly identified as containing the target phoneme /k/ (false positives).

All of the example lesson types described above are designed to reinforce the specific reader 110's understanding and pronunciation of the target phoneme (e.g., /k/) through visual, auditory, and/or interactive methods. By focusing on the specific areas of difficulty, the plan generation module 336 ensures that the specific reader 110 receives targeted practice, which can lead to more effective learning outcomes. The feedback provided throughout the lessons also helps the specific reader 110 to self-correct and understand their progress, fostering a sense of achievement and motivation to continue improving their reading skills.

Figure 6:
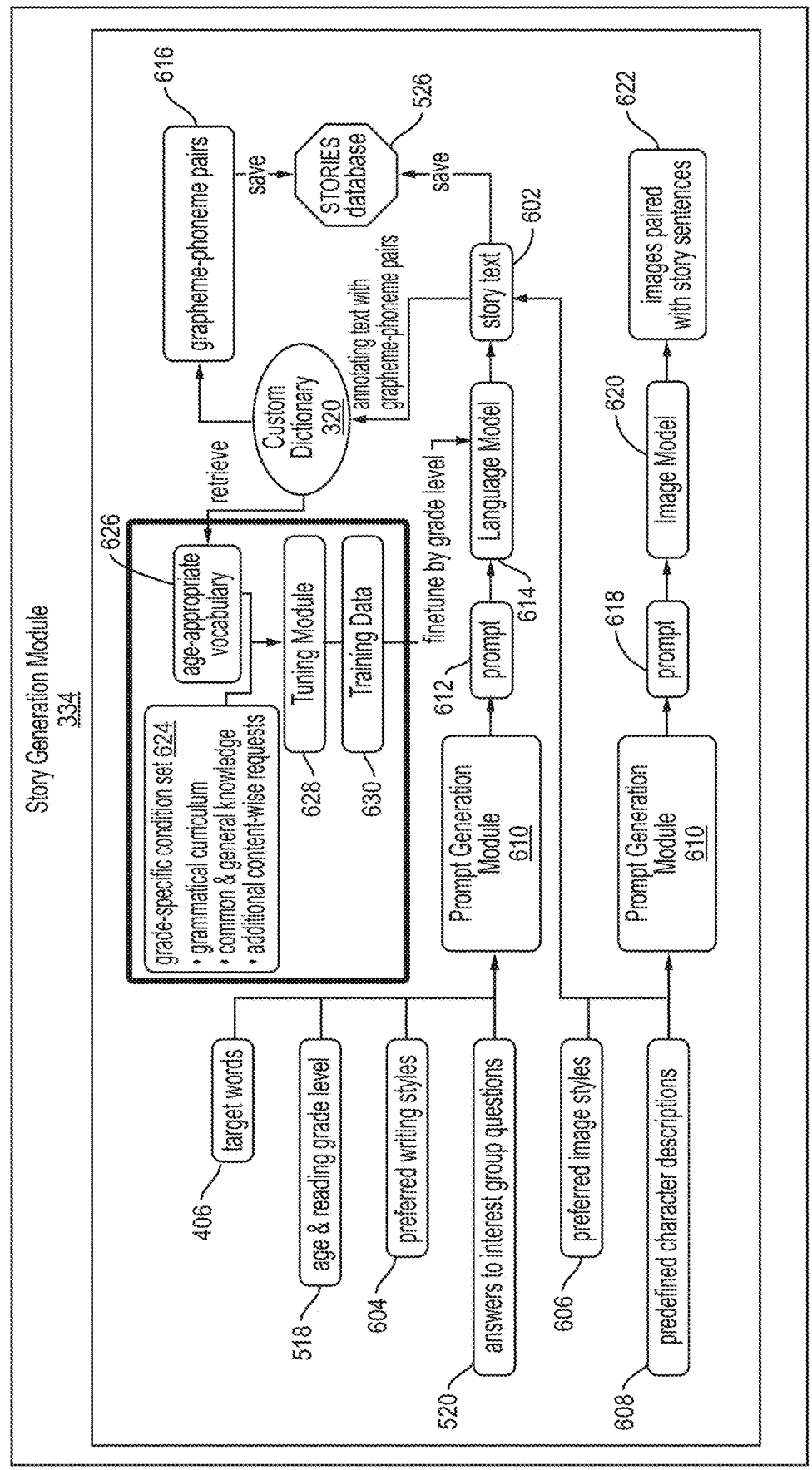
FIG. 6 is a diagram of a system including the story generation module according to one embodiment of the present invention.

Referring to FIG. 6, an embodiment of a system 600 including the story generation module 334 is shown. In general, the story generation module 334 generates story text 602 that is customized for the specific learning needs and preferences of individual readers, such as the specific reader 110. In particular, the story generation module 334 may create story text 602 that emphasizes the grapheme-phoneme pairs with which the specific reader 110 has shown difficulty. The story generation module 334 may also generate story images 622 that are customized for the specific learning needs and preferences of individual readers, such as the specific reader 110. Example embodiments of the system 600 will now be described.

The story generation module 334 may obtain the specific reader 110's current list of target words 406, which may have previously been received, generated, or otherwise identified in any of the ways disclosed herein. The story generation module 334 may also obtain the specific reader 110's age and reading grade level 518, which may have previously been received, generated, or otherwise identified in any of the ways disclosed herein.

The story generation module 334 may obtain a set of the specific reader 110's preferred writing styles 604, which may include one or more writing styles in which the specific reader 110 prefers for text to be written. Examples of the specific reader 110's preferred writing styles 604 include science fact, science fiction, fairy tale, adventure, and fantasy. The specific reader 110's preferred writing styles 604 may be identified in any of a variety of ways, such as by receiving input specifying the specific reader 110's story text 602 during the registration process of FIG. 1A and/or the initial interview process of FIG. 1B.

The story generation module 334 may also obtain the specific reader 110's answers to interest group questions 520, which may have previously been received, generated, or otherwise identified in any of the ways disclosed herein, such as by receiving input specifying the specific reader 110's answers to interest group questions 520 during the registration process of FIG. 1A and/or the initial interview process of FIG. 1B.

The system 600 also includes a prompt generation module 610. The prompt generation module 610 may receive as input one or more of the personalized target words 406, age and reading grade level 518, preferred writing styles 604, and answers to interest group questions 520, and generates, based on such input(s), a prompt 612. More generally, the prompt generation module 610 may receive any of a variety of inputs and use such inputs to generate the prompt 612, such as data obtained from previous interactions with the specific reader 110 and external educational databases. The resulting prompt 612 is suitable for use as input to a language model 614, such as a member of the GPT family (e.g., any variant of GPT-3 or GPT-4).

The story generation module 334 provides the prompt 612 as input to the language model 614 to generate the story text 602. As will be described in more detail below, the language model 614 may have previously been fine-tuned to align with characteristics specific to the specific reader 110, such as any one or more of the personalized target words 406, the age and reading grade level 518, the preferred writing styles 604, and the answers to interest group questions 520. Any of a variety of techniques may be used to post-process the story text 602, such as sentiment analysis, style transfer, and text summarization. The results of such post-processing may then be used as the story text 602.

As the above description illustrates, the primary purpose of the story generation module 334 is to deliver highly personalized story content that aligns with the specific reader 110's reading level, linguistic skills, and personal interests. It ensures that the content is not only accessible but also engaging by incorporating elements that reflect the specific reader 110's preferences and educational needs. This includes adjusting the complexity of the text, the themes of the stories, and the inclusion of specific target words that address challenging grapheme-phoneme pairs. This targeted approach helps the specific reader 110 practice and master specific phonetic and reading skills without repetitive learning of limited vocabulary.

The story generation module 334 is designed to dynamically adapt the story text 602 that it generates based on the ongoing assessment of the specific reader 110's progress. By continuously monitoring the specific reader 110's interactions and achievements, the module adjusts the difficulty level of the stories, updates the target words, and modifies the reading age level as needed. This adaptability ensures that the educational content remains challenging yet achievable, promoting continuous learning and development.

The prompt 612 may take any of a variety of forms. For example, the prompt 612 may include not only text which requests content to be generated by the language model 614 within the story text 602, but also text which requests that the language model 614 generate metadata associated with the story in the story text 602, where examples of such metadata include a reading grade level of the story text 602 and one or more topics covered by the story text 602. As a result, when the language model 614 is provided with the prompt 612, the story text 602 that is generated by the language model 614 may include the text of a story and the language model 614's estimated reading grade level of that story and one or more topics covered by that story. The story generation module 334 may remove the reading grade level and topics from the story text 602 so that only the text of the story remains in the story text 602 for presentation to the specific reader 110.

The prompt 612 may also be designed to cause the language model 614 to generate the story text 602 in a format that is easy to parse. For example, the prompt 612 may be designed so that the story text 602 generated by the language model 614 includes one or more elements (e.g., story title, contents, self-evaluated reading level, and/or self-extracted topics) which are adapted to be extracted easily with a specified regex format. As a result, the story text 602 may be easily parsed using regular expressions. One way to achieve such an easily-parseable story text 602 is to use few-shot learning within the prompt 612 to provide several examples of story text output having the desired easily-parseable format. For example, the story text examples in the prompt 612 may include delimiters or other demarcations for different story sections, such as title, introduction, body, conclusion. The use of examples via few-shot learning may also provide the language model 614 with guidance about other aspects of the story text 602 to be generated, such as the complexity of the desired story and/or the choice of words (e.g., personalized target words 406) to include in the story text 602.

Once the story text 602 is generated, the story generation module 334 may apply one or more predefined regex patterns to extract the necessary metadata and structural elements of the story from the story text 602. This process is efficient and reduces the need for manual intervention, allowing for quick adjustments to the story within the story text 602 before it is presented to the specific reader 110. The story generation module 334 may perform other post-processing on the story text 602 before outputting it to the specific reader 110, such as simplifying the language, adjusting the narrative to better align with the reader's interests, or removing extraneous metadata from the visible text presented to the specific reader 110.

The story generation module 334 may annotate the story text 602 with grapheme-phoneme pairs, resulting in a set of grapheme-phoneme pairs 616 corresponding to some or all of the words in the story text 602. The story generation module 334 may, for example, use the custom dictionary 320 to annotate each sentence in the story text 602 with a corresponding sequence of grapheme-phoneme pairs. The set of grapheme-phoneme pairs 616 may provide a guide for the specific reader 110 to focus on specific areas of difficulty within the context of the story. The story generation module 334 may also generate and story any of a variety of statistics based on the set of grapheme-phoneme pairs 616, such as the frequency of each pair's occurrence within the story in the story text 602. These statistics can help educators and the system itself to understand which pairs are being emphasized and how often they appear. The annotated story text story text 602, along with its set of grapheme-phoneme pairs 616 and any associated statistics, may be stored in the stories database 526. As the method illustrated in FIG. 6 is repeated in connection with a plurality of stories, the stories database 526 may build a collection of stories and their associated grapheme-phoneme pairs and associated statistics. Stories may also be added to the stories database 526 in any of a variety of ways, such as by adding them manually. Regardless of how stories are added to the stories database 526, stories within the stories database 526 may be stored in a way that allows for easy retrieval and analysis, such as by indexing stories by reading level, grapheme-phoneme pairs, and/or other relevant criteria.

As mentioned above, the story generation module 334 may also generate story images 622 that are customized for the specific learning needs and preferences of individual readers, such as the specific reader 110. The story generation module 334 may include one or more preferred image styles 606 associated with the specific reader 110. In general, the one or more preferred image styles 606 represent one or more preferred styles in which the specific reader 110 prefers for images to be generated (e.g., cartoon, realistic, abstract). The story generation module 334 may obtain the preferred image styles 606 in any of a variety of ways, such as by retrieving and/or generating them based on the reader-specific data 108. The story generation module 334 may include one or more predefined character descriptions 608 associated with the specific reader 110 (e.g., friendly dragon, brave astronaut). In general, the one or more predefined character descriptions 608 represent one or more descriptions of characters that are preferred by the specific reader 110. The story generation module 334 may obtain the one or more predefined character descriptions 608 in any of a variety of ways, such as by retrieving and/or generating them based on the reader-specific data 108.

The prompt generation module 610 may receive as input one or both of the one or more preferred image styles 606 and the one or more predefined character descriptions 608, and generate, based on such input(s), a prompt 618. More generally, the prompt generation module 610 may receive any of a variety of inputs and use such inputs to generate the prompt 618, such as data obtained from previous interactions with the specific reader 110 and external educational databases. The resulting prompt 618 is suitable for use as input to an image generation model 620, such as a text-to-image model, such as a member of the DALL-E family of text-to-image models. The prompt generation module 610 may generate the prompt 618 to request an image that is in one or more of the one or more preferred image styles 606 and that contains one or more characters based on the one or more predefined character descriptions 608. The prompt generation module 610 may use a different method to generate the prompt 618 than the method that is used to generate the prompt 612.

The story generation module 334 provides the prompt 618 as input to the image generation model 620 to generate the story images 622. The story generation module 334 may also pair each of the generated images 622 with one or more corresponding sentences in the story text 602, thereby ensuring that the visual content of the story images 622 supports and enhances the narrative of the story text 602. The story generation module 334 may store the 622, including their associations with sentences in the story text 602, in the stories database 526.

The story-generation and image-generation processes, as described in the context of the story generation module 334, offer several distinct advantages both individually and when integrated together. These advantages enhance the educational experience, making learning more engaging, personalized, and effective for individual readers. For example, the story-generation process tailors content to the specific needs and preferences of the specific reader 110, such as reading level, interests, and learning objectives. This personalization helps maintain the specific reader 110's interest and motivation, as the stories are directly relevant to their experiences and challenges. The story generation module 334 may dynamically adjust the complexity and content of the stories based on the specific reader 110's progress. This adaptability ensures that the reading material is neither too easy nor too challenging, which is crucial for optimal learning progression. By leveraging large language models (LLMs), the story generation module 334 can produce rich, varied, and linguistically appropriate content. This use of advanced AI enhances the creativity and diversity of the stories, providing a broader range of reading experiences.

The image-generation process creates customized visuals that complement the story text 602, catering to visual learners who might grasp concepts more effectively through images. This can help in better understanding and retention of information. Customized images, especially when aligned with the specific reader 110's preferences (e.g., favorite characters or themes), increase engagement. Visuals that are appealing and interesting to the specific reader 110 can make the learning process more enjoyable and immersive. Furthermore, images can simplify or clarify complex ideas presented in the story text 602, making them more accessible. This is particularly beneficial in educational settings where abstract or difficult concepts need to be explained.

When the story text 602 and story images 622 are generated in tandem, they form cohesive units of educational content. Text and visuals that are designed to complement each other provide a more holistic learning experience, reinforcing the material through multiple modalities. Images that are specifically generated to match the story text can reinforce the context and setting of the narrative, helping readers to better visualize and understand the story's environment and characters. This deepens comprehension and makes the reading experience more vivid and memorable.

As mentioned above, the language model 614 may have previously been fine-tuned to better meet the needs of the specific reader 110 and/or other readers. Such fine-tuning may, for example, enhance the ability of the language model 614 to generate story text 602 that is both age-appropriate and grade-appropriate for the specific reader 110 and other readers.

The language model 614 may be fine-tuned as follows. Human educators may compile a grade-specific condition set 624 that includes elements of a grammatical curriculum, common and general knowledge, and additional content-wise requests that are appropriate for different grade levels. This grade-specific condition set 624 may serve as a guideline for the type of content that should be generated for readers at each grade level, ensuring that the language, themes, and knowledge presented are suitable for their educational development. An age-appropriate vocabulary set 626, containing vocabulary words that are deemed to be age-appropriate for each of a plurality of grade levels, may also be compiled.

A tuning module 628 may receive the grade-specific condition set 624 and age-appropriate vocabulary set 626 as inputs and generate, based on those inputs, training data 630 and/or other output for use in fine-tuning the language model 614. Examples of the training data 630 include sample stories, self-evaluated age appropriateness, educational passages, and other text types that embody the language complexity and thematic elements suitable for the target age group. The training data 630 may be manually reviewed to ensure quality and relevance before using the training data 630 to fine-tune the language model 614. This review process may help in refining the content to better match the anticipated textual distribution, which includes writing style, preferred vocabulary, and relevant knowledge. In addition to the target words, the training data 630 may be enriched with additional vocabulary that complements the given word lists, ensuring the creation of coherent and meaningful stories. This approach allows the language model 614 to naturally incorporate a broader range of vocabulary and knowledge without overly prescriptive input requirements.

The story generation module 334 may fine-tune the language model 614 based on the training data 630 to create a fine-tuned version of the language model 614. Fine-tuning may be performed using any of a variety of machine learning techniques, such as supervised learning, where the model is trained on the training data 630 with human-provided correct responses, or through reinforcement learning, where the language model 614 receives feedback on its outputs.

After fine-tuning the language model 614, the story generation module 334 may evaluate the language model 614's outputs evaluated against a set of metrics to determine whether they are indeed grade-appropriate and age-appropriate. These metrics may include, for example, readability scores, alignment with educational standards, and feedback from educators. If the outputs are not satisfactory, the story generation module 334 may repeat the fine-tuning process with adjusted inputs (e.g., grade-specific condition set 624, age-appropriate vocabulary set 626, and/or training data 630) or parameters until the desired level of appropriateness is achieved.

The fine-tuning may be performed any number of times over time to repeatedly update the fine-tuning of the language model 614, such as based on updated versions of the grade-specific condition set 624 and/or the age-appropriate vocabulary set 626.

The fine-tuning process has a variety of benefits. For example, the fine-tuned language model 614 is better equipped to produce text that is directly relevant to the educational level and interests of readers, such as specific reader 110. This relevance is crucial for maintaining engagement and promoting effective learning. The fine-tuning process allows the language model 614 to adapt its output based on the evolving educational needs and preferences of readers, such as the specific reader 110. This adaptability is key to providing personalized learning experiences that grow with the reader specific 110. With the fine-tuned model 614, the need for manual adjustments in content generation may be significantly reduced. This streamlining makes the content creation process more efficient and less labor-intensive, allowing educators and developers to focus more on content delivery and less on content modification.

Figure 7:
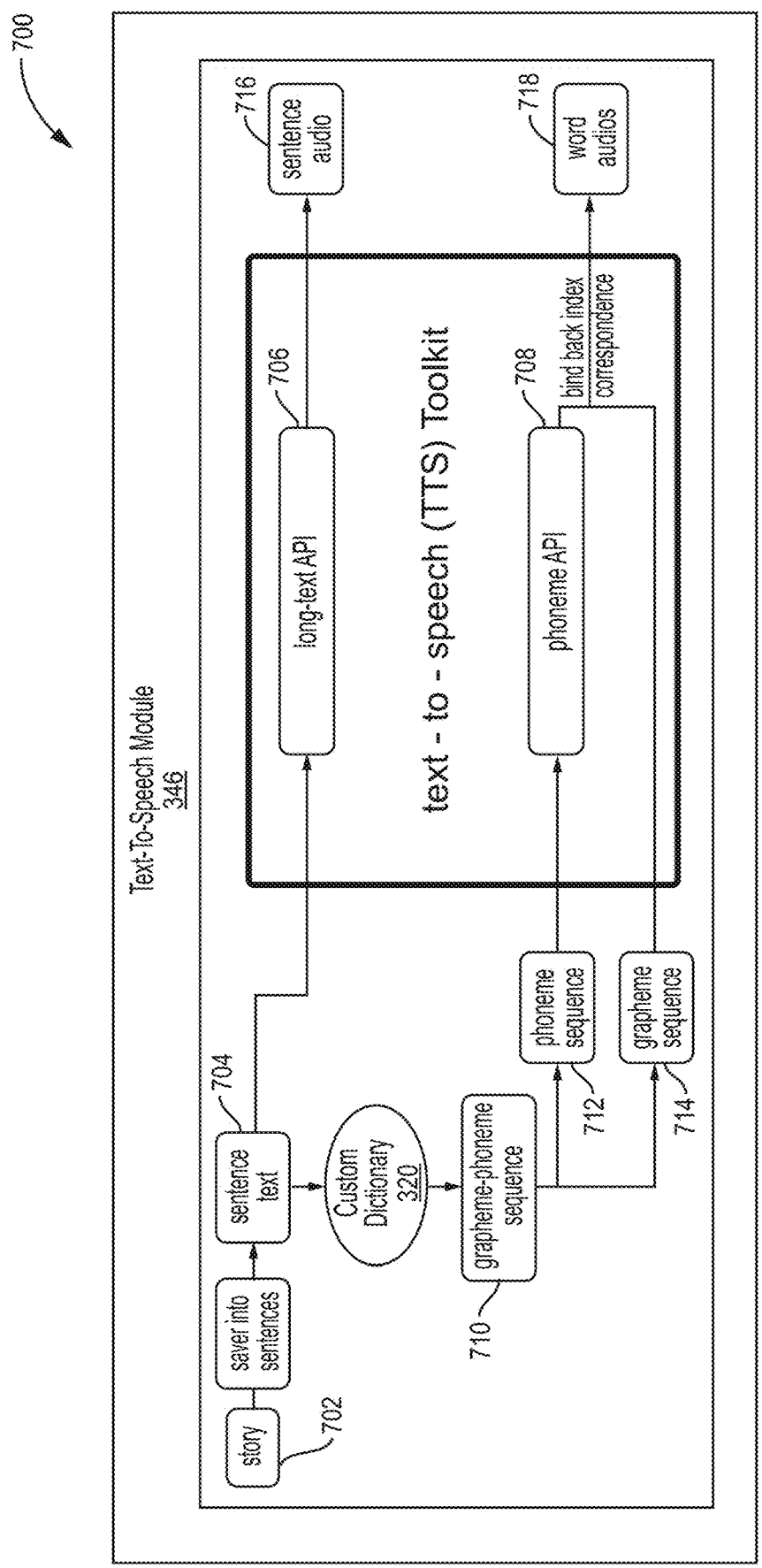
FIG. 7 is a diagram of a system which includes a text-to-speech module according to one embodiment of the present invention.

As mentioned above, the system 300 includes a text-to-speech module 346. Referring to FIG. 7, a system 700 which includes one embodiment of the text-to-speech module 346 is shown.

The text-to-speech module 346 includes a story 702, which may, for example, be an instance of the story text 602 from FIG. 6 or any subset thereof. The story 702 may, for example, be one of the generated stories 338, one of the repurposed stories 342, or a story within one of the lessons 344 shown in FIGS. 3A-3D. In general, and as will now be described in more detail, when an embodiment of the invention presents the story 702 to the specific reader 110, the text-to-speech module 346 may display and speak (i.e., generate audio output of) the sentences, words, graphemes, and phonemes within that story 702.

More specifically, the text-to-speech module 346 may divide the story 702 into individual sentences, each of which is shown in FIG. 7 as sentence text 704. Although only one sentence text 704 is shown in FIG. 7 for ease of illustration, the text-to-speech module 346 may perform the functions disclosed herein for some or all of the sentences within the story 702. Furthermore, although the process of dividing the story 702 into sentences is shown within the text-to-speech module 346 in FIG. 7, such a function may alternatively be performed elsewhere, such as within the story generation module 334 of FIG. 6.

The text-to-speech module 346 displays the sentence text 704 to the specific reader 110. If, while the sentence text 704 is being displayed, the specific reader 110 clicks on or otherwise selects the displayed sentence text 704 (such as by selecting a box containing the displayed sentence text 704), then, in response, the text-to-speech module 346 reads the entire sentence text 704 aloud, thereby generating sentence audio 716. (Any reference herein to the text-to-speech module 346 or any other module of the invention reading text aloud should be understood to refer to generating audio output representing actual or simulated speech reciting the sequence of words in the sentence text 704.) The text-to-speech module 346 may, for example, read the entire sentence text 704 aloud using a conventional text-to-speech engine, such as the long-text reading API 706 of the Microsoft Azure text-to-speech (TTS) toolkit. While reading the sentence text 704 aloud, the text-to-speech module 346 may visually emphasize each word as it is being read aloud.

If, while the sentence text 704 is being displayed, the specific reader 110 clicks on or otherwise selects an individual word within the displayed sentence text 704, then the text-to-speech module 346 performs a sequence of actions:

Identifies each phoneme (P) in the spoken version of the word.
Finds the corresponding grapheme (G) within the written word.
Speaks the phoneme (P) aloud.
Visually emphasizes the grapheme (G) (e.g., by bolding or changing color) while the phoneme is spoken.

One way in which the text-to-speech module 346 may perform the above steps is as follows. The text-to-speech module 346 may use the custom dictionary 320 to generate or otherwise identify a grapheme-phoneme sequence 710 corresponding to the sentence text 704. The text-to-speech module 346 extracts the phoneme sequence 712 from the grapheme-phoneme sequence 710. The text-to-speech module 346 also extracts the grapheme sequence 714 from the grapheme-phoneme sequence 710. For each phoneme in the phoneme sequence 712, the text-to-speech module 346 uses a phoneme text-to-speech module (such as the phoneme API 708 of the Microsoft Azure text-to-speech toolkit), to read the phoneme aloud, identifies the corresponding grapheme(s) in the grapheme sequence 714, and emphasizes the corresponding displayed grapheme(s). When the text-to-speech module 346 reads the next phoneme in the phoneme sequence 712, the text-to-speech module 346 de-emphasizes the previously-emphasized grapheme in the grapheme sequence 714, so that only the grapheme corresponding to the currently read-aloud phoneme is visually emphasized. The audio generated by reading the phonemes in the phoneme sequence 712 aloud are shown in FIG. 7 as word audios 718.

To provide further guidance to the specific reader 110, after reading aloud all phonemes for each word sequentially in the manner just described, the text-to-speech module 346 may then read the entire word aloud. When doing so, the text-to-speech module 346 may visually emphasize the entire word.

The text-to-speech module 346 has a variety of advantages. For example, the text-to-speech module 346 supports learning by engaging both visual and auditory senses of the specific reader 110. This dual engagement helps in reinforcing learning as information is processed through multiple sensory channels, which can improve memory and recall. By allowing the specific reader 110 to interact with the text, such as selecting sentences or words to be read aloud, the module promotes an active learning environment. This interactivity keeps the specific reader 110 engaged and can make the learning process more enjoyable and effective. The text-to-speech module 346 enhances language learning by breaking down words into phonemes and graphemes, and correlating these with their spoken and written forms. This feature is particularly valuable for readers learning phonics or those with reading difficulties, as it aids in understanding the basic building blocks of language. As the text-to-speech module 346 reads text aloud, it visually emphasizes each word or grapheme, enhancing the specific reader 110's ability to follow along with the spoken content. This synchronization between visual cues and audio output helps in better understanding and processing of the information.

Figure 8:
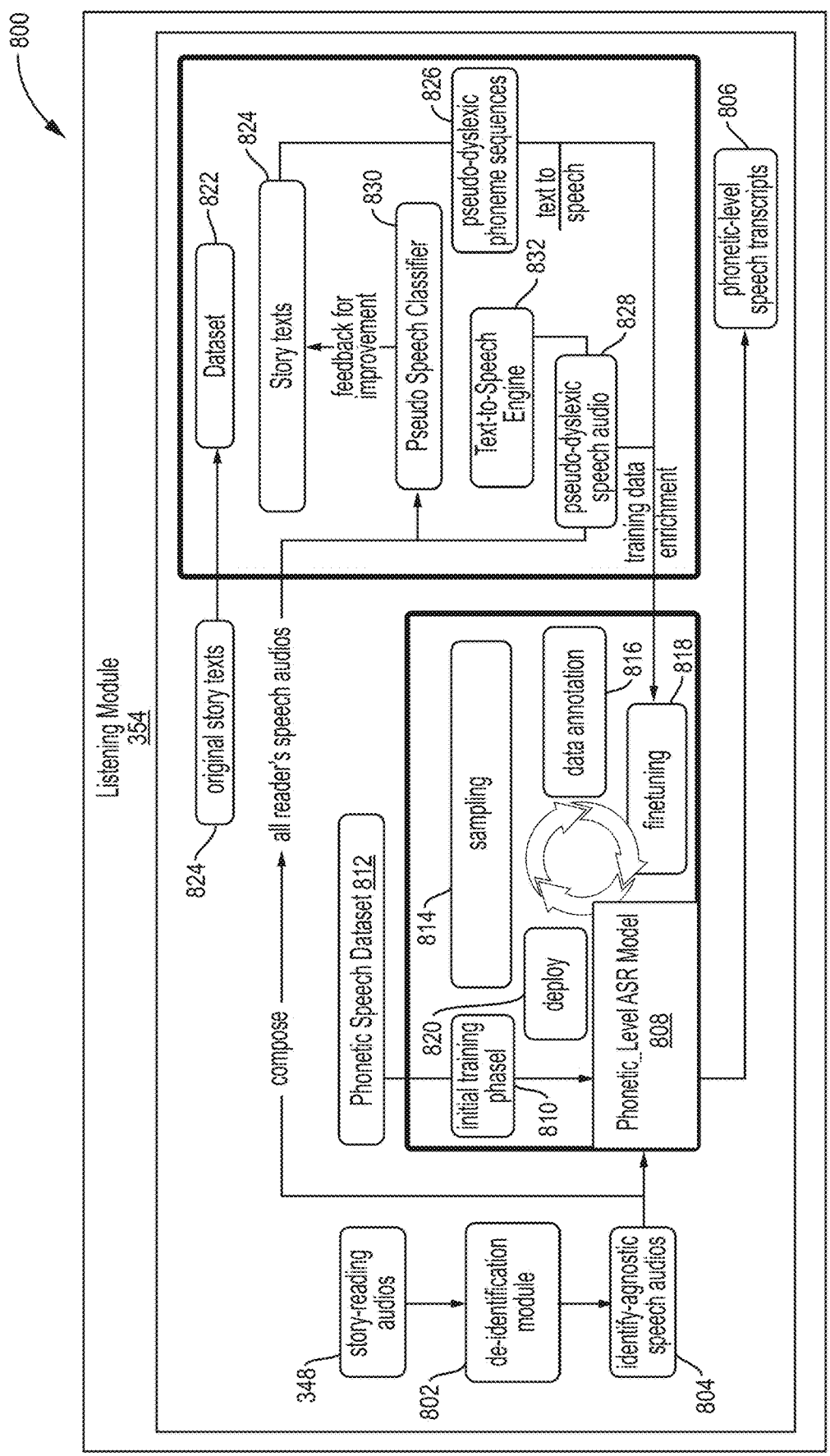
FIG. 8 is a diagram of a system which includes a listening module according to one embodiment of the present invention.

As mentioned above, the system 300 includes a listening module 354. Referring to FIG. 8, a system 800 which includes one embodiment of the listening module 354 is shown.

As previously mentioned, as the specific reader 110 reads stories aloud, the listening module 354 may capture the specific reader 110's speech to generate story-reading audios 348. The listening module 354 may include a de-identification module 802, which may de-identify the story-reading audios 348 using any of a variety of techniques to generate de-identified story-reading audios 804. The de-identification process is optional. As a result, although the explanation below refers to performing a variety of functions on the de-identified story-reading audios 804, any such functions may instead be performed on the story-reading audios 348 in embodiments in which de-identification is not performed.

The listening module 354 performs phonetic-level automatic speech recognition on the de-identified story-reading audios 804 to generate one or more phonetic-level speech transcripts 806 of the story-reading audios 348. The listening module 354 may, for example, perform such automatic phonetic-level speech recognition using a phonetic-level ASR model 808.

The phonetic-level ASR model 808 may be trained in the following manner. Such training may, for example, be performed before using the phonetic-level ASR model 808 to perform ASR on the story-reading audios 348 to generate the one or more phonetic-level speech transcripts 806. The training techniques disclosed herein, however, may be performed repeatedly on the phonetic-level ASR model 808 over time, such as based on updated training data, to retrain the phonetic-level ASR model 808 and thereby improve it over time. Such training and/or retraining may, for example, include training (e.g., pre-training and/or retraining) the phonetic-level ASR model 808 for use to recognize the speech of dyslexic readers.

The initial training phase 810 of the phonetic-level Automatic Speech Recognition (ASR) model 808 involves configuring the model 808 to accurately interpret and transcribe phonetic data. This phase begins with a foundational model structure, such as the Phonetic Automatic Speech Recognition Model equipped with WavLM Feature Extraction Heads. WavLM, known for its proficiency in handling multiple speech-related tasks, serves as the primary feature extraction mechanism within the model.

The phonetic-level ASR model 808 integrates the WavLM feature extraction heads as its uppermost layers. These layers, which are pretrained, remain fixed during the training process to preserve their specialized capability in extracting relevant speech features. To enhance the phonetic-level ASR model 808's understanding of the extracted features and to improve its output accuracy, additional encoder blocks may be appended to these top layers. These encoder blocks are specifically designed and pretrained for this application, focusing on refining the phonetic-level ASR model 808's processing capabilities without the interference of a decoder.

In some embodiments, a significant aspect of the phonetic-level ASR model 808 is its decoder-free architecture. This design choice is driven by the desire to avoid any potential auto-correction mechanisms typically present in decoders that could alter the raw outputs of the speech recognition process. By eliminating the decoder, embodiments of the phonetic-level ASR model 808 ensure that the outputs remain true to the actual spoken input, thereby providing a more accurate and unmodified transcription.

For the training of the phonetic-level ASR model 808, a phonetic speech dataset 812, such as the TIMIT Phonetic Speech Dataset, may be employed. The phonetic speech dataset 812 is comprised of audio recordings paired with their corresponding phonetic transcriptions, offering a diverse array of phoneme pronunciations across different linguistic contexts. The use of this dataset 812 allows the model 808 to learn and adapt to the nuances of phonetic sounds, enhancing its ability to accurately recognize and transcribe spoken words as they are naturally articulated.

The listening module 354 may update the phonetic-level ASR model 808 one or more times over time, such as by performing the following steps. The listening module 354 may sample 814 a plurality of story-reading audios 348, which may include many story-reading audios from multiple readers. This sampling may focuses predominantly on high error-rate speech (e.g., 80%) and on a smaller proportion of low error-rate speech (e.g., 20%). This strategy is designed to prioritize learning from the most challenging cases while still maintaining a baseline understanding of well-transcribed speech.

Human experts perform data annotation 816 to provide accurate phonetic-level labels for the story-reading audios 348. This step is valuable for ensuring that the phonetic-level ASR model 808 has a reliable ground truth to learn from.

Using the newly annotated data, the listening module 354 fine-tunes 818 the current model checkpoint. The fine-tuning process adjusts the phonetic-level ASR model 808's parameters to better fit the annotated data, thereby reducing the error rate on target speech patterns unique to dyslexic children.

Once the model 808 has been fine-tuned and demonstrates improved performance on a test set, the listening module 354 deploys 820 the new model checkpoint for use in transcribing speech.

The described process for creating and updating the phonetic-level ASR model 808 is a strategic approach to developing a speech recognition system that improves over time and adapts to readers' speech characteristics. By focusing on areas where the model 808 currently underperforms, the listening module 354 aims to achieve a high level of accuracy and personalization in transcribing speech.

Steps 814, 816, 818, and 820 may be performed repeatedly any number of times. Furthermore, although it can be useful to perform all of steps 814, 816, and 818 as part of the model retraining process.

The model training and retraining processes described above have a variety of advantages. For example, by sampling a majority of story-reading audios with high error rates (approximately 80%), the listening module 354 prioritizes learning from the most challenging cases. This approach allows the model to directly address and improve upon its weaknesses, thereby enhancing its overall accuracy and reliability. Including a smaller proportion of low error-rate speech (approximately 20%) ensures that the model 808 maintains a comprehensive understanding of well-transcribed speech. This balance prevents the model 808 from becoming overly tuned to problematic inputs and preserves its effectiveness across a broad range of speech types.

The involvement of human experts in annotating the story-reading audios 348 provides the model 808 with highly accurate phonetic-level labels. This expert validation serves as a reliable ground truth, which can be valuable for the effective training and fine-tuning of the model. The fine-tuning step adjusts the model 808's parameters specifically to better fit the annotated data, which includes unique speech patterns such as those found in dyslexic children. This tailored adjustment allows the model 808 to more accurately recognize and transcribe speech from this specific group, enhancing its utility in educational and supportive technologies. By continuously adjusting the model 808 to decrease its error rates on targeted speech patterns, the update process ensures that the model 808 becomes increasingly proficient over time. This ongoing improvement is critical for applications where high accuracy is essential, such as in educational settings.

The listening module 354 may generate additional training data for the phonetic-level ASR model 808, such as by performing the following steps. The generation and use of such additional training data to update the training of the phonetic-level ASR model 808 may enhance the phonetic-level ASR model 808's ability to recognize speech patterns associated with dyslexia.

The system 800 may include a dataset 822 representing common dyslexic speech patterns. The dataset 822 may, for example, be handcrafted and updated by human experts to reflect the typical errors and characteristics of dyslexic speech.

The system 800 also includes a set of story texts 824, such as some or all of the story texts previously generated by embodiments of the present invention. Using the set of common dyslexic speech patterns, the listening module 354 employs a Text-to-Speech module to generate pseudo-dyslexic speech audio 828, which simulates how dyslexic readers might read the story texts 824 aloud, including the errors that would be expected to be introduced by dyslexic readers. The listening module 354 may then generate, based on such pseudo-dyslexic speech audio 828, corresponding pseudo-dyslexic phoneme sequences 826 representing the sequences of phonemes in the pseudo-dyslexic speech audio 828. The pseudo-dyslexic phoneme sequences 826 represent the phoneme sequences that would be expected to be produced by dyslexic readers who read the set of story texts 824 aloud.

More specifically, the listening module 354 may use the custom dictionary 320 to generate grapheme-phoneme annotations of the story texts 824. The listening module 354 may use mutation rules to generate the pseudo-dyslexic phoneme sequences 826 based on the grapheme-phoneme annotations of the story texts 824. The listening module 354 may use a phoneme-level text-to-speech engine 832 to generate the pseudo-dyslexic audios 828 based on the pseudo-dyslexic phoneme sequences 826.

The listening module 354 may use the resulting pseudo-dyslexic phoneme sequences 826 as labels for the corresponding pseudo-dyslexic audios 828 to train a pseudo-speech classifier 830. Because such training data simulate the speech of dyslexic readers, including expected errors, the resulting pseudo-speech classifier 830 reflects the reading patterns of dyslexic readers. The pseudo-speech classifier 830 is adapted to perform binary identification, namely to determine whether a given audio clip is human-spoken or computer-generated.

The listening module 354 may use the pseudo-dyslexic phoneme sequences 826 and/or the pseudo-dyslexic speech audio 828 to enrich the training data that the listening module 354 uses to train/retrain the phonetic-level ASR model 808. By incorporating pseudo-dyslexic phoneme sequences 826 and audios 828, the training dataset for the phonetic-level ASR model 808 is enriched with a wide range of dyslexic speech patterns. This includes various errors and anomalies typical of dyslexic speech, such as mispronunciations, elongations, and hesitations. This diversity helps the model 808 learn to recognize and accurately transcribe a broader spectrum of speech variations, which are characteristic of dyslexic readers. Dyslexic speech patterns can pose significant challenges for speech recognition systems due to their unpredictability and deviation from standard speech. Training the model 808 on these complex patterns forces the ASR system to adapt to and overcome these challenges, thereby enhancing its robustness and ability to handle difficult real-world speech recognition tasks. In particular, such enhancement of the phonetic-level ASR model 808's training data enables the phonetic-level ASR model 808 to more accurately transcribe speech from dyslexic readers, reducing misrecognition and enhancing the reliability of the transcriptions.

Figure 9:
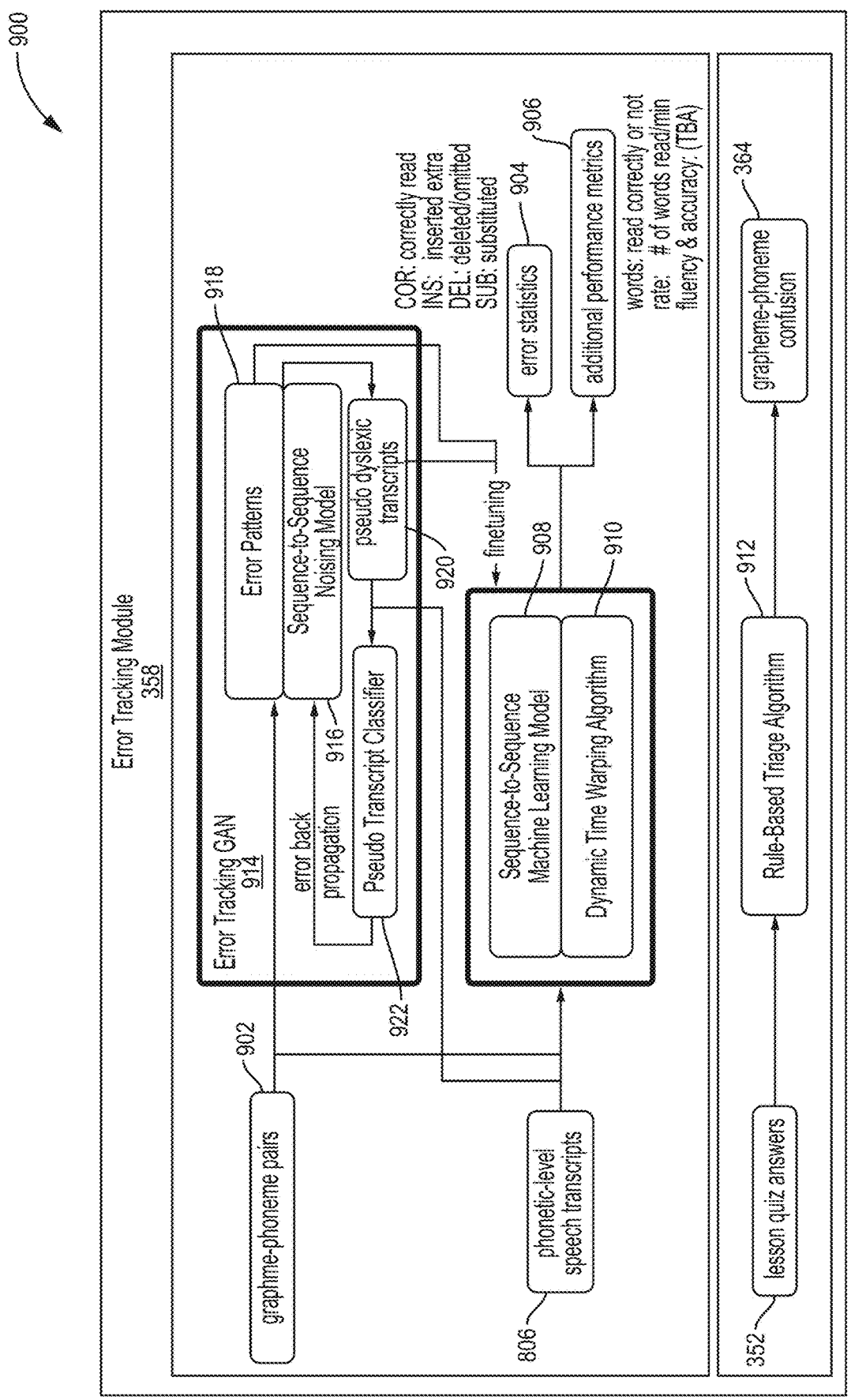
FIG. 9 is a diagram of a system which includes an error-tracking module according to one embodiment of the present invention.

As mentioned above, the system 300 includes an error tracking module 358. Referring to FIG. 9, a system 900 which includes one embodiment of the error-tracking module 358 is shown. As will be described in more detail below, the error tracking module 358 is designed to identify and track phonetic errors in the specific reader 110's speech as they read stories aloud.

The error tracking module 358 receives as input a plurality of story texts and their corresponding grapheme-phoneme pairs 902. The grapheme-phoneme pairs 902 may, for example, be generated based on the plurality of story texts using the custom dictionary 320 in any of the ways disclosed herein. Regardless of how the plurality of story texts and their corresponding grapheme-phoneme pairs 902 are generated, they serve as the "ground truth" or "golden" standard for comparison in the process that follows.

The error tracking module 358 also receives as input a plurality of phonetic-level speech transcripts 806 of the specific reader 110's speech when reading one or more stories. The one or more phonetic-level speech transcripts 806 may be generated in any of the ways disclosed herein, such as by using the techniques disclosed in connection with FIG. 8.

The error tracking module 358 compares the specific phonetic-level speech transcripts 806 against the golden grapheme-phoneme pairs 902, thereby generating a set of grapheme-phoneme level error statistics 904, which reflect the accuracy of the specific reader 110's reading. This comparison involves aligning the phonemes produced by the specific reader 110 (as reflected in the phonetic-level speech transcripts) with the expected phonemes (as reflected in the golden grapheme-phoneme pairs). Discrepancies between these two sets are identified as errors. Such errors may include, for example, any one or more of the following for each grapheme-phoneme pair: (1) correctly read; (2) inserted extra phoneme; (3) deleted (omitted) phoneme; (4) substituted phoneme.

The error tracking module 358 may include a sequence-to-sequence machine learning model 908, which the error tracking module 358 may use in the process of generating the set of grapheme-phoneme level error statistics 904.

The error tracking module 358 may also include a dynamic time warping algorithm 910, which the error tracking module 358 may apply to align the specific reader 110's spoken phonemes with the golden grapheme-phoneme pairs 902, thereby allowing for the identification of errors even when the timing of the specific reader 110's speech varies.

The error tracking module 358 may also generate, based on the specific phonetic-level speech transcripts 806 and the golden grapheme-phoneme pairs 902, any of a variety of additional performance metrics 906, such as any one or more of the following: word-level accuracy (e.g., whether each word in the story text was read correctly by the specific reader 110); reading rate (e.g., the number of words read per minute by the specific reader 110); fluency (e.g., the number of words read correctly per minute); and accuracy (e.g., the percentage of words read correctly by the specific reader 110 for a given story text).

The error tracking module 358, as integrated within system 300, offers significant technical benefits in the realms of speech recognition and educational technology. This module is specifically designed to identify and track phonetic errors in the speech of a reader as they read stories aloud, using advanced algorithms and comparison techniques. The error tracking module 358's utilization of golden grapheme-phoneme pairs 902 as a benchmark to identify discrepancies in the phonetic-level speech transcripts 806 allows for precise identification of various types of phonetic errors, such as inserted extra phonemes, deleted phonemes, and substituted phonemes. The ability to categorize and pinpoint these errors enhances the diagnostic capability of the system 300 as a whole, providing detailed insights into the specific phonetic challenges faced by the specific reader 110. Furthermore, the integration of the dynamic time warping algorithm 910 enables the error tracking module 358 to effectively align the spoken phonemes with the golden grapheme-phoneme pairs, even when there are variations in the timing of the specific reader 110's speech. This adaptability is crucial for accurately tracking errors in real-time speech, where timing discrepancies can otherwise lead to misalignment and incorrect error identification.

By incorporating the sequence-to-sequence machine learning model 908, the error tracking module 358 not only identifies errors but also learns from them. This sequence-to-sequence machine learning model 908 can adapt and improve over time, enhancing its ability to predict and identify phonetic errors as more data is processed. This continuous learning capability is highly valuable for systems that require high accuracy in diverse and evolving educational environments. Beyond simple error tracking, the module 358 is capable of generating a variety of additional performance metrics 906, such as word-level accuracy, reading rate, fluency, and overall accuracy. These metrics provide a holistic view of the specific reader 110's performance, offering valuable data for educators and speech therapists to assess progress and tailor interventions more effectively.

As previously mentioned, the error tracking module 358 may generate a grapheme-phoneme confusion matrix 364 for the specific reader 110, such as by performing the following steps. As previously described, the system 300 may generate the specific reader 110's lesson quiz answers 352 as the result of the specific reader 110 taking one or more lessons. An example of such a lesson is one in which the system 300 presents the specific reader 110 with the text of a story and asks the specific reader 110 to select all words that contain a specific grapheme pronounced as a certain phoneme. The specific reader 110 makes selections of words which the specific reader 110 believes contain the indicated grapheme-phoneme pair.

As shown in FIG. 9, the error tracking module 358 may include a rule-based triage algorithm 912, which may receive the specific reader 110's lesson quiz answers 352 (from one or more lessons) and generate, based on the lesson quiz answers 352, the grapheme-phoneme confusion matrix 364. For example, the rule-based triage algorithm 912 may identify words in the story that contain the targeted grapheme-phoneme pair, but which were not selected by the specific reader 110 (false negatives). Based on the false negatives, the rule-based triage algorithm 912 may generate the grapheme-phoneme confusion matrix 364, which may include a tabular representation of the frequency of the specific reader 110's confusion between different graphemes and the targeted phoneme. Embodiments of the invention may use the listening module 354 to determine which specific grapheme-phoneme pairs, especially in combination with other pairs present in the words the specific reader 110 missed, are challenging for the specific reader 110 to read correctly.

The listening module 354 helps in analyzing the pattern of errors the specific reader 110 makes, revealing which grapheme-phoneme pairs are consistently misunderstood or not recognized. By identifying these patterns, embodiments of the present invention may use the listening module 354 to tailor learning activities to specifically address the specific reader 110's difficulties with certain grapheme-phoneme combinations. Over time, changes in the listening module 354 may indicate the specific reader 110's progress in learning to correctly identify phonemes within words.

The error tracking module 358 may also include an error-tracking GAN 914 (Generative Adversarial Network). The error-tracking GAN 914 may receive the golden grapheme-phoneme pairs 902 as input. The error-tracking GAN 914 may include a sequence-to-sequence noising model 916 that utilizes the golden grapheme-phoneme pairs 902 to generate pseudo-dyslexic transcripts 920, which contain phonemes transcribed from typical dyslexic speech. This noising model 916 introduces errors into the golden grapheme-phoneme pairs 902 to create the pseudo-dyslexic transcripts 920, which mimic the types of errors a dyslexic reader might make when reading. To assist in introducing such errors, the noising model 916 makes use of error patterns 918, which may have been hand-crafted by human experts. These error 918 patterns reflect common reading errors made by dyslexic readers.

The error-tracking GAN 914 also includes a pseudo-dyslexic transcript classifier 922, which the error-tracking GAN 914 trains based on the pseudo-dyslexic transcripts 920. The error-tracking GAN 914 back-propagates the errors from training the pseudo-dyslexic transcript classifier 922 to the noising model 916. The primary purpose of this error back-propagation is to optimize the performance of the noising model 916. By back-propagating errors identified during the training of the pseudo-dyslexic transcript classifier 922, the error-tracking GAN 914 can adjust and refine the parameters of the noising model 916 to better simulate the types of errors typically made by dyslexic readers. Through iterative adjustments based on back-propagated errors, the noising model 916 becomes more adept at generating realistic pseudo-dyslexic transcripts 920. This process is typically iterative, with multiple rounds of simulation, classification, error detection, and back-propagation. Each cycle aims to reduce the error rate further, thereby continuously improving the fidelity of the simulated transcripts and the effectiveness of the classifier 922. This increased accuracy in simulation helps in creating training data that closely mirrors actual dyslexic speech patterns, which is crucial for developing effective recognition and intervention tools.

The error tracking module 358 may use the error patterns 918 and the pseudo-dyslexic transcripts 920 to fine-tune the sequence-to-sequence machine learning model 908. This fine-tuning process may enhance the sequence-to-sequence machine learning model 908's ability to accurately process and interpret phonetic data as it would appear in real-world scenarios involving dyslexic readers. The fine-tuned version of the sequence-to-sequence machine learning model 908 is better equipped to recognize, interpret, and possibly even predict dyslexic errors in reading. This enhanced capability makes the fine-tuned sequence-to-sequence machine learning model 908 a valuable tool for applications in educational technology, where accurate identification of dyslexic patterns can lead to more effective teaching strategies and interventions. The fine-tuning may be repeated any number of times as new and improved versions of the error patterns 918 and/or pseudo-dyslexic transcripts 920 become available.

Figure 10:
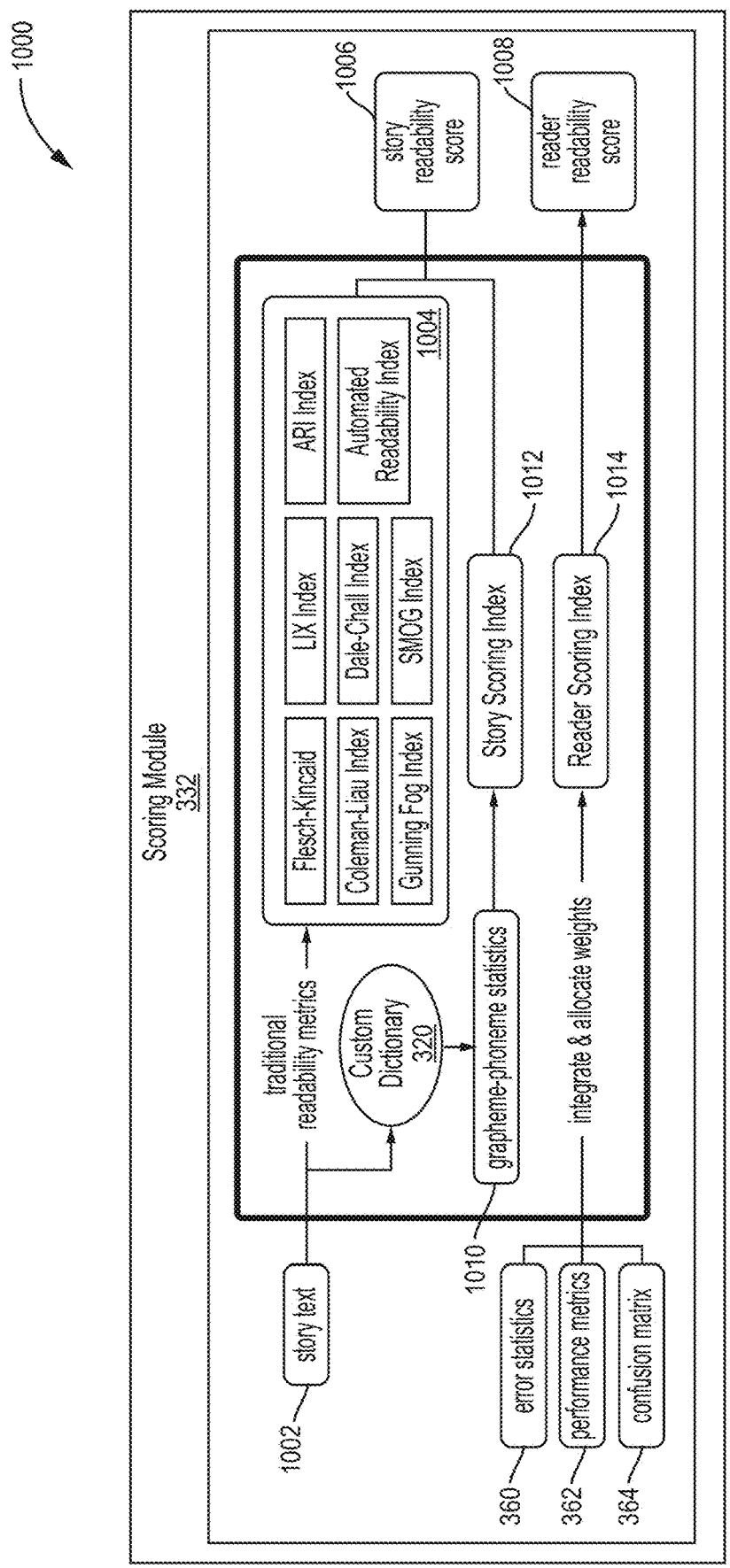
FIG. 10 is a diagram of a system which includes a scoring module according to one embodiment of the present invention.

As mentioned above, the system 300 includes scoring module 332. Referring to FIG. 10, a system 1000 which includes one embodiment of the scoring module 332 is shown. As will be described in more detail below, the scoring module 332 is designed to evaluate the readability of story texts and to assist in the creation of reading assignments that are appropriately challenging for the specific reader 110.

The scoring module 332 may receive story text 1002 as input, which may be the text of any story, such as a story that the specific reader 110 currently is reading or has read as part of taking an assignment. The scoring module 332 may apply one or more traditional readability metrics to the story text 1002, such as any one of more of the following, to generate a story readability score 1006: Flesch-Kincaid Grade Level, LIX Index, Coleman-Liau Index, Dale-Chall Readability Formula, Gunning Fog Index, and SMOG Index. Such metrics 1004 may, for example, analyze the story text 1002 for factors such as sentence length, word length, syllable count, and vocabulary difficulty to estimate the grade level required for comprehension.

The scoring module 332 uses the custom dictionary 320 to generate grapheme-phoneme statistics 1010 based on the story text 1002. This may involve, for example, analyzing the story text 1002 to determine the frequency and distribution of grapheme-phoneme pairs within it.

The scoring module 332 applies a story scoring index 1012 to the grapheme-phoneme statistics 1010. In general, the story scoring index 1012 may be designed to evaluate the readability of the story text 1002 by analyzing the complexity of its grapheme-phoneme pairs in relation to the ages at which these pairs are typically acquired by readers. To create the story scoring index 1012, the distribution of grapheme-phoneme pairs across different ages of acquisition may be computed. For example, simpler pairs like (c, K) might be acquired at an earlier age, such as age 1, while more complex pairs like (ch, K) might be acquired at a later age. Then a comprehensive table that lists grapheme-phoneme pairs along with their respective ages of acquisition may be created. This table serves as a reference to determine the expected reading level needed to understand different grapheme-phoneme combinations within a text. Using the grapheme-phoneme annotations of the story text, the average age of acquisition is calculated. This involves analyzing the grapheme-phoneme pairs used throughout the story and referencing the age of acquisition table to compute an average age level at which the story's text would be accessible to readers. If reliable age of acquisition data for grapheme-phoneme pairs is available, the process can be deterministic, providing a straightforward measure of text complexity based on the ages at which the included grapheme-phoneme pairs are typically learned. If such data is not available or is incomplete, a more probabilistic approach similar to the Flesch-Kincaid readability tests might be used. This approach would consider the number of grapheme-phoneme pairs within words and sentences to analyze text complexity. The method might explore constants and formulas experimentally to find a correlation between the presence of certain grapheme-phoneme pairs and the overall complexity of the text.

The scoring module 332 uses the output of the story scoring index 1012 and the results of applying the such metrics 1004 to generate a story readability score 1006 corresponding to the story text 1002. The story readability score 1006 may, for example, be a weighted sum of the results of the such metrics 1004 and the results of applying the story scoring index 1012.

The scoring module 332 also includes a reader scoring index 1014, which may be constructed and operate in the same or similar ways to the story scoring index 1012, except that the reader scoring index 1014 may be optimized for generating a reader readability score 1008. The scoring module 332 may integrate and allocate weights associated with the updated reader error statistics 360, updated additional performance metrics 362, and updated grapheme-phoneme confusion matrix 364. For example, frequent phonetic errors might be given higher weights compared to less common errors, reflecting their greater impact on overall reading proficiency. The scoring module 332 may apply the reader scoring index 1014 to the resulting integrated and weighted data to generate the reader readability score 1008, which is a representation of the specific reader 110's ability to read the story text 1002. The reader readability score 1008 may take any of a variety of forms, such as a single number.

Although certain descriptions of embodiments of the present invention refer to its use in assisting readers with dyslexia, it is important to note that the methodologies and systems described herein are equally applicable to a broader range of reading and speech-related challenges. The adaptive and personalized nature of embodiments of the present invention makes such embodiments suitable for assisting individuals with various types of speech impediments and reading difficulties that may arise from a range of physical and neurological conditions, not merely dyslexia.

For example, embodiments of the present invention may be effectively utilized to support readers who have speech impediments that affect their ability to pronounce words correctly, which may in turn impact their reading fluency and comprehension. Additionally, embodiments of the present invention may be beneficial for individuals suffering from neurological conditions such as Asperger's Syndrome or other conditions falling within the scope of Autism Spectrum Disorder (ASD), where challenges with language processing and social communication can hinder reading and learning. Furthermore, embodiments of the present invention may be used to aid individuals recovering from traumatic brain injuries (TBIs) and other afflictions, which may cause people to experience temporary or permanent difficulties with reading and language skills.

The core technology of generating personalized reading content based on detailed error analysis and reader-specific performance metrics allows for a highly tailored educational experience. This approach not only addresses specific phonetic and decoding challenges, as seen in dyslexia, but also accommodates the unique learning needs and pace of individuals with other conditions affecting their reading abilities. By integrating comprehensive performance statistics and adaptive content generation, embodiments of the present invention ensure that all learners, regardless of their specific challenges, can benefit from a reading assistance program that adjusts to their individual needs.

Thus, embodiments of the present invention are not limited to use in connection with dyslexia, but is intended to be a versatile tool in the broader field of educational technology, providing support to a diverse population of learners. By acknowledging and designing for the spectrum of challenges that affect reading, embodiments of the present invention stand to offer significant educational benefits to a wide range of users, promoting inclusivity and accessibility in learning environments. As a result, any disclosure herein in relation to dyslexia should be understood not to be limiting in nature.

One embodiment of the present invention is directed to a method, performed by at least one computer processor executing computer program instructions stored on at least one non-transitory computer-readable medium. The method is a method for generating personalized story text for a reader. The method includes: (A) identifying a set of statistics based on the reader's reading of text other than the personalized story text, wherein the set of statistics associated with the reader are based on performance of the reader at the word level and the grapheme-phoneme level, and wherein the set of statistics are based on substitutions, insertions, deletions, and correct utterances by the reader, when reading the text other than the personalized story text, categorized on at least one of the grapheme level and the phoneme level. The method may further include: (B) training a language model based on at least one of an age of the reader and a reading grade level of the reader. The method may further include: (C) generating, using the language model after training the language model, the personalized story text based on the set of statistics, the generating comprising: (C)(1) generating a story text creation prompt based on the set of statistics, wherein the story text creation prompt includes a set of target words and a topic of interest to the reader; and (C)(2) providing the story text creation prompt to the language model to generate the personalized story text based on the generated prompt, wherein the personalized story text includes at least some of the target words.

One embodiment of the present invention is directed to a method, performed by at least one computer processor executing computer program instructions stored on at least one non-transitory computer-readable medium. The method is a method for generating personalized story text for a reader. The method includes: (A) identifying a set of statistics based on performance of the reader when reading text other than the personalized story text; and (B) generating, using a language model, the personalized story text based on the set of statistics. The statistics in the set of statistics may be on the grapheme-phoneme level. The method may integrate such grapheme-phoneme level statistics into the language model's inference process in any of a variety of ways, so that words with target grapheme-phoneme pairs are more likely to be included in the personalized story text generated by the language model. Examples of such integration include: (1) converting: e.g., mapping the grapheme-phoneme level statistics to weights on sub-words/tokens in the language model; and (2) projecting: e.g., or applying numerical transformations to align with the typical scale used for predicting the next token in the sequence that is output by the language model.

Operation (B) may include: (B)(1) generating a story text creation prompt based on the set of statistics; and (B)(2) providing the story text creation prompt to the language model to generate the personalized story text based on the generated prompt.

Operation (B) may include: (B)(1) training the language model based on at least one of an age of the reader and a reading grade level of the reader; and (B)(2) generating the personalized story text based on the set of statistics, using the language model, after training the language model. The training in (B)(1) may, for example, including initial training, retraining, and/or fine-tuning of the language model.

The training in (B)(1) may, for example, include training the language model using text that is deemed to be appropriate for the reader's biological age and/or reading grade level. For example, (B)(1) may include training the language model based only on a set of target words for the reader, or only on words that are deemed to be appropriate for the reader's biological age and/or reading grade level, so that the language model can only generate output containing such words.

A prediction subword probability matrix contains the probabilities that the language model assigns to each potential next subword (a part of a word or a whole word, depending on the tokenization approach) given the current state of the text being generated. Generating the personalized story text based on the set of statistics may include modifying the prediction subword probability matrix, such as by adding extra weights or a scaled constant to the entries corresponding to the target words in the prediction subword probability matrix. As a result, the target words will have a higher probability of being generated next by the language model.

Operation (B) may include: (B)(1) identifying a set of target words for the reader; and (B)(2) generating, using the language model, the personalized story text based on the set of statistics and the set of target words. Operation (B)(1) may include: (B)(1)(a) ranking selected words appropriate for a reading grade level of the reader; and (B)(1)(b) identifying a set of highest-ranked selected words as the set of target words for the reader. Identifying the set of target words for the reader may include selecting, based on the set of statistics associated with the reader, words that correspond to grapheme-phoneme pairs with which the reader has demonstrated difficulty decoding. "Decoding" refers to the cognition process that involves recognizing a grapheme and identifying the phoneme that corresponds to the grapheme. For example, the word "ship" consists of three graphemes: 's', 'h', and 'ip'. These graphemes correspond to the phonemes /s/, /h/, and /Ip/. Decoding includes recognizing these graphemes and blending their corresponding phonemes to pronounce the word correctly.

The set of statistics may include a set of phoneme-level performance statistics. The set of statistics may include a set of grapheme-level performance statistics. The set of statistics may include a set of grapheme-phoneme-level performance statistics. The set of statistics may include a set of word-level performance statistics.

Any particular grapheme-phoneme level statistic may correspond to a grapheme-phoneme pair in which the "grapheme" consists of a single grapheme (i.e., one or a few consecutive letters that correspond to a single phoneme), a subword (e.g., "ment" or "pre"), a full word, or a phrase containing a plurality of words.

Operation (B)(1) may include generating the story text creation prompt based on the set of performance statistics and at least one of: (1) an age of the reader; and (2) a reading grade level of the reader.

Operation (B)(1) may include generating the story text creation prompt based on the set of performance statistics and at least one of: (1) a preferred writing style of the reader; and (2) an interest of the reader.

Operation (B) may include generating, using the language model, the personalized story text based on the set of statistics and an age of the reader.

Operation (B) may include generating, using the language model, the personalized story text based on the set of statistics and a reading grade level of the reader.

Operation (B) may include generating, using the language model, the personalized story text based on the set of statistics and a preferred writing style of the reader.

Operation (B) may include generating, using the language model, the personalized story text based on the set of statistics and an interest of the reader.

The method may further include: (C) annotating the personalized story text with corresponding grapheme-phoneme pairs; and (D) storing the personalized story text and the corresponding grapheme-phoneme pairs in a story database.

The method may further include: (D) generating an image creation prompt based on the personalized story text; and (E) providing the image creation prompt to a text-to-image model to generate at least one image. Operation (D) may include generating the image creation prompt based on the personalized story text, at least one preferred image style of the reader, and at least one character description.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the invention analyze large datasets of error statistics and performance metrics to identify specific grapheme-phoneme conversion errors. This analysis requires processing and interpreting vast amounts of data at speeds and with a level of accuracy that is beyond human capability.

Additionally, embodiments of the present invention generate personalized story text creation prompts that are based on a complex interplay of factors such as the reader's age, reading grade level, preferred writing style, interests, and identified target words. The computational power required to synthesize these variables into a coherent and tailored prompt is substantial and necessitates the use of advanced algorithms and language models that can only be operated within a computerized environment.

Moreover, the weighting and ranking of words within a dictionary according to grapheme-phoneme importance factors derived from individual error statistics involves computational processes that are inherently rooted in computer technology. The allocation of weights, the subsequent ranking of words, and the dynamic updating of these rankings as new data is processed cannot be feasibly accomplished without the aid of computer systems.

The storage and retrieval of generated story texts and their associated grapheme-phoneme pair annotations in a story database also represent features that rely on computer technology. The database not only needs to store large volumes of data but also must be capable of efficiently organizing, indexing, and retrieving this data upon request. This functionality is enabled by database management systems that are designed to handle such complex tasks.

In summary, the technical improvements provided by embodiments of the invention are deeply rooted in computer technology, as they rely on the computational power, speed, and data handling capabilities that only modern computer systems can offer. These improvements enable embodiments of the invention to address and overcome the limitations of prior art in a manner that is not possible through mental or manual efforts alone.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

Any language model disclosed herein may, for example, include one or more language models, such as any one or more of the following, in any combination:
 a unigram language model;
 an n-gram language model;
 an exponential language model;

a generative language model;
an autoregressive language model; and
a neural network language model.

Any language model disclosed may, for example, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters. Embodiments of the present invention may, however, use language models of any suitable size.

Any language model disclosed herein may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte.

Any language model disclosed herein may, for example, include one or more of each of the types of language models above, unless otherwise specified. As a particular example, any language model disclosed herein may, unless otherwise specified, be or include any one or more of the following language models, in any combination:

Any language model in the GPT-n series of language models (such as GPT-1, GPT-2, GPT-3, or GPT-4) available from OpenAI Incorporated of San Francisco, California;

any version of the Language Model for Dialogue Applications (LaMDA), Generalist Language Model (GLaM), Pathways Language Model (PaLM), or Gemini language model, available from Google LLC of Mountain View, California;

any version of the Gopher language model, available from DeepMind Technologies of London, United Kingdom;

any version of the Turing-NLG (Turing Natural Language Generation) language model, available from Microsoft Corporation of Redmond, Washington;

any version of the Megatron Language Model (Megatron-LM), available from Nvidia Corporation of Santa Clara, California; and any version of the Large Language Model Meta AI (LLaMA), available from Meta Platforms, Inc. of Menlo Park, California.

What is claimed is:

1. A method, performed by at least one computer processor executing computer program instructions stored on at least one non-transitory computer-readable medium, for generating personalized story text for a reader, the method comprising:
   (A) generating, based on the reader's reading of text other than the personalized story text, a set of statistics representing performance of the reader at the word level and a set of statistics representing performance of the reader at the grapheme-phoneme level, the generating comprising:
      performing phoneme-level automatic speech recognition on audio of the reader's speech to generate a phonetic transcript;
      using a grapheme-phoneme dictionary to align graphemes from the text with phonemes from the phonetic transcript;
      generating, based on the alignment of the graphemes with the phonemes:
         the set of statistics representing the performance of the reader at the grapheme-phoneme level; and
         the set of statistics representing the performance of the reader at the word level by determining which words in the text were read correctly by the reader;
      wherein the set of statistics representing the performance of the reader at the grapheme-phoneme level includes, for each of a plurality of grapheme-phoneme pairs, data indicating whether the reader substituted a phoneme, inserted a phoneme, deleted a phoneme, or correctly uttered a phoneme when reading a corresponding grapheme;
   (B) training a transformer-based neural network-based language model based on at least one of an age of the reader and a reading level of the reader, wherein the transformer-based neural network-based language model includes at least 1 billion parameters;
   (C) generating, using the transformer-based neural network-based language model after training the transformer-based neural network-based language model, the personalized story text based on the set of statistics representing the performance of the reader at the word level and the set of statistics representing the performance of the reader at the grapheme-phoneme level, the generating comprising:
      (C)(1) identifying a set of target words based on the set of statistics representing the performance of the reader at the word level and the set of statistics representing the performance of the reader at the grapheme-phoneme level;
      (C)(2) generating a story text creation prompt based on the set of target words, wherein the story text creation prompt includes the set of target words and a topic of interest to the reader; and
      (C)(3) providing the story text creation prompt to the transformer-based neural network-based language model to generate the personalized story text based on the story text creation prompt, wherein the personalized story text includes at least some of the target words.

2. A system comprising at least one non-transitory computer-readable medium having computer program instructions stored thereon, the computer program instructions being executable by at least one computer processor to perform a method for generating personalized story text for a reader, the method comprising:
   (A) generating, based on the reader's reading of text other than the personalized story text, a set of statistics representing performance of the reader at the word level and a set of statistics representing performance of the reader at the grapheme-phoneme level, the generating comprising:
      performing phoneme-level automatic speech recognition on audio of the reader's speech to generate a phonetic transcript;
      using a grapheme-phoneme dictionary to align graphemes from the text with phonemes from the phonetic transcript;
      generating, based on the alignment of the graphemes with the phonemes:
         the set of statistics representing the performance of the reader at the grapheme-phoneme level; and
         the set of statistics representing the performance of the reader at the word level by determining which words in the text were read correctly by the reader;
      wherein the set of statistics representing the performance of the reader at the grapheme-phoneme level includes, for each of a plurality of grapheme-phoneme pairs, data indicating whether the reader substituted a phoneme, inserted a phoneme, deleted a phoneme, or correctly uttered a phoneme when reading a corresponding grapheme;

(B) training a transformer-based neural network-based language model based on at least one of an age of the reader and a reading level of the reader, wherein the transformer-based neural network-based language model includes at least 1 billion parameters;

(C) generating, using the transformer-based neural network-based language model after training the transformer-based neural network-based language model, the personalized story text based on the set of statistics representing the performance of the reader at the word level and the set of statistics representing the performance of the reader at the grapheme-phoneme level, the generating comprising:

(C)(1) identifying a set of target words based on the set of statistics representing the performance of the reader at the word level and the set of statistics representing the performance of the reader at the grapheme-phoneme level;

(C)(2) generating a story text creation prompt based on the set of target words, wherein the story text creation prompt includes the set of target words and a topic of interest to the reader; and (C)(3) providing the story text creation prompt to the transformer-based neural network-based language model to generate the personalized story text based on the story text creation prompt, wherein the personalized story text includes at least some of the target words.

3. A method, performed by at least one computer processor executing computer program instructions stored on at least one non-transitory computer-readable medium, for generating personalized story text for a reader, the method comprising:

(A) generating, based on performance of the reader when reading text other than the personalized story text, a set of statistics representing performance of the reader at the word level and a set of statistics representing performance of the reader at the grapheme-phoneme level, the generating comprising:

performing phoneme-level automatic speech recognition on audio of the reader's speech to generate a phonetic transcript;

using a grapheme-phoneme dictionary to align graphemes from the text with phonemes from the phonetic transcript;

generating, based on the alignment of the graphemes with the phonemes:

the set of statistics representing the performance of the reader at the grapheme-phoneme level; and the set of statistics representing the performance of the reader at the word level by determining which words in the text were read correctly by the reader;

wherein the set of statistics representing the performance of the reader at the grapheme-phoneme level includes, for each of a plurality of grapheme-phoneme pairs, data indicating whether the reader substituted a phoneme, inserted a phoneme, deleted a phoneme, or correctly uttered a phoneme when reading a corresponding grapheme; and (B) generating, using a transformer-based neural network-based language model including at least 1 billion parameters, the personalized story text based on the set of statistics representing the performance of the reader at the word level and the set of statistics representing the performance of the reader at the grapheme-phoneme level, the generating comprising:

(B)(1) identifying a set of target words based on the set of statistics representing the performance of the reader at the word level and the set of statistics representing the performance of the reader at the grapheme-phoneme level;

(B)(2) generating a story text creation prompt based on the set of target words, wherein the story text creation prompt includes the set of target words and a topic of interest to the reader; and (B)(3) providing the story text creation prompt to the transformer-based neural network-based language model to generate the personalized story text based on the story text creation prompt, wherein the personalized story text includes at least some of the target words.

4. The method of claim 3, wherein generating the personalized story text comprises:

training the transformer-based neural network-based language model based on at least one of an age of the reader and a reading level of the reader; and generating the personalized story text based on the set of statistics, using the transformer-based neural network-based language model, after training the transformer-based neural network-based language model.

5. The method of claim 4, wherein generating the personalized story text based on the set of statistics comprises generating, using the transformer-based neural network-based language model, the personalized story text based on the set of statistics and an age of the reader.

6. The method of claim 4, wherein generating the personalized story text based on the set of statistics comprises generating, using the transformer-based neural network-based language model, the personalized story text based on the set of statistics and the reading level of the reader.

7. The method of claim 4, wherein generating the personalized story text based on the set of statistics comprises generating, using the transformer-based neural network-based language model, the personalized story text based on the set of statistics and a preferred writing style of the reader.

8. The method of claim 4, wherein generating the personalized story text based on the set of statistics comprises generating, using the transformer-based neural network-based language model, the personalized story text based on the set of statistics and an interest of the reader.

9. The method of claim 3, wherein generating the personalized story text comprises:

(B)(1) identifying a set of target words for the reader; and (B)(2) generating, using the transformer-based neural network-based language model, the personalized story text based on the set of statistics and the set of target words.

10. The method of claim 9, wherein identifying the set of target words for the reader comprises:

(B)(1) (a) ranking selected words appropriate for a reading level of the reader; and (B)(1) (b) identifying a set of highest-ranked selected words as the set of target words for the reader.

11. The method of claim 9, wherein identifying the set of target words for the reader comprises selecting, based on the set of statistics associated with the reader, words that correspond to grapheme-phoneme pairs with which the reader has demonstrated difficulty decoding.

12. The method of claim 3, wherein identifying the set of target words for the reader comprises generating the story text creation prompt based on the set of statistics and at least one of: (1) an age of the reader; and (2) a reading level of the reader.

13. The method of claim 3, wherein identifying the set of target words for the reader comprises identifying the set of target words for the reader based on the set of statistics representing the performance of the reader at the word level and the set of statistics representing the performance of the reader at the grapheme-phoneme level and at least one of: (1) a preferred writing style of the reader; and (2) an interest of the reader.

14. The method of claim 3, further comprising:
   (C) annotating the personalized story text with corresponding grapheme-phoneme pairs; and
   (D) storing the personalized story text and the corresponding grapheme-phoneme pairs in a story database.

15. The method of claim 3, further comprising:
   (D) generating an image creation prompt based on the personalized story text; and
   (E) providing the image creation prompt to a text-to-image model to generate at least one image.

16. The method of claim 15, wherein (D) comprises generating the image creation prompt based on the personalized story text, at least one preferred image style of the reader, and at least one character description.

\* \* \* \* \*